United States Patent
Kano

(10) Patent No.: US 9,178,818 B2
(45) Date of Patent: Nov. 3, 2015

(54) COMMUNICATION APPARATUS

(71) Applicant: FUJITSU LIMITED, Kawasaki-shi, Kanagawa (JP)

(72) Inventor: Shinya Kano, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 20 days.

(21) Appl. No.: 13/850,486

(22) Filed: Mar. 26, 2013

(65) Prior Publication Data

US 2013/0279508 A1 Oct. 24, 2013

(30) Foreign Application Priority Data

Apr. 20, 2012 (JP) ................................. 2012-097200

(51) Int. Cl.
*H04L 12/28* (2006.01)
*H04L 12/747* (2013.01)
*H04W 4/00* (2009.01)

(52) U.S. Cl.
CPC .................................... *H04L 45/742* (2013.01)

(58) Field of Classification Search
CPC ................... H04L 29/12009; H04L 29/12367; H04L 61/2514; H04L 61/2007; H04L 61/2575; H04W 8/04; H04W 40/248
USPC .......................................... 370/392, 401, 389
See application file for complete search history.

(56) References Cited

U.S. PATENT DOCUMENTS

| 6,414,962 | B1 | 7/2002 | Hall et al. | |
|---|---|---|---|---|
| 2003/0231628 | A1* | 12/2003 | Harada et al. | 370/389 |
| 2011/0261800 | A1* | 10/2011 | You et al. | 370/338 |

FOREIGN PATENT DOCUMENTS

| JP | 2002-506302 | 2/2002 |
|---|---|---|
| JP | 2004-23450 | 1/2004 |

OTHER PUBLICATIONS

V. Fuller et al., "LISP Alternative Topology (LISP+ALT) draft-ietf-lisp-alt-10.txt", Dec. 6, 2011, pp. 1-30.
D. Farinacci et al., "Locator/ID Separation Protocol (LISP) draft-ietf-lisp-22", Feb. 12, 2012, pp. 1-97.

* cited by examiner

*Primary Examiner* — Charles C Jiang
*Assistant Examiner* — Will Lin
(74) *Attorney, Agent, or Firm* — Staas & Halsey LLP

(57) ABSTRACT

A communication apparatus that couples to a core network in a network system including a first access network coupled to the core network via a first relay, and a second access network coupled to the core network via a second relay, the communication apparatus including: a processor to store, when a first packet is transmitted to a first destination address included in a first address range and not included in a second address range, cache information regarding the second address range to a memory, the first address range being assigned to the first access network and the second address range being assigned to the second access network and being included in the first address range, and a transmitter to transmit, when a second packet for a second address included in the second address range is generated, the second packer to the second apparatus based on the cache information.

10 Claims, 23 Drawing Sheets

FIG. 9A

| DESTINATION ID RANGE | | TRANSFER DESTINATION LOC |
|---|---|---|
| NETWORK ADDRESS | MASK LENGTH | |
| A.B.0.0 | 16 | LOC2 |
| C.D.128.0 | 24 | LOC4 |
| E.F.50.0 | 24 | LOC5 |
| ⋮ | ⋮ | ⋮ |

FIG. 9B

| DESTINATION ID RANGE | |
|---|---|
| NETWORK ADDRESS | MASK LENGTH |
| A.B.128.0 | 24 |
| A.B.77.0 | 24 |
| C.D.128.192 | 26 |
| ⋮ | ⋮ |

FIG. 10A

| MESSAGE TYPE | LOC REQUEST MESSAGE |
|---|---|
| DESTINATION ID RANGE | A.B.10.11 |

FIG. 10B

| MESSAGE TYPE | | | LOC RESPONSE MESSAGE |
|---|---|---|---|
| ROUTE INFORMATION | DESTINATION ID RANGE | NETWORK ADDRESS | A.B.0.0 |
| | | MASK LENGTH | 16 |
| | TRANSFER DESTINATION LOC | | LOC2 |
| EXCLUSION ROUTE INFORMATION | DESTINATION ID RANGE | NETWORK ADDRESS | A.B.128.0 |
| | | MASK LENGTH | 24 |
| EXCLUSION ROUTE INFORMATION | DESTINATION ID RANGE | NETWORK ADDRESS | A.B.77.0 |
| | | MASK LENGTH | 24 |
| ⋮ | ⋮ | ⋮ | ⋮ |

FIG. 13

| ROUTE INFORMATION | MESSAGE TYPE | | ID-LOC REGISTRATION MESSAGE |
|---|---|---|---|
| | DESTINATION ID RANGE | NETWORK ADDRESS | A.B.0.0 |
| | | MASK LENGTH | 16 |
| | TRANSFER DESTINATION LOC | | LOC2 |

FIG. 15

| DESTINATION ID RANGE | | RELAY DESTINATION |
|---|---|---|
| NETWORK ADDRESS | MASK LENGTH | |
| A.B.0.0 | 16 | LOC2 |
| A.B.128.0 | 24 | LOC3 |
| E.F.50.0 | 24 | LOC4 |
| ⋮ | ⋮ | ⋮ |

FIG. 16

| MESSAGE TYPE | | | LOC REQUEST MESSAGE |
|---|---|---|---|
| DESTINATION ID | | | A.B.10.11 |
| EXCLUSION ROUTE INFORMATION | DESTINATION ID RANGE | NETWORK ADDRESS | A.B.128.0 |
| | | MASK LENGTH | 24 |
| EXCLUSION ROUTE INFORMATION | DESTINATION ID RANGE | NETWORK ADDRESS | A.B.77.0 |
| | | MASK LENGTH | 24 |
| ⋮ | ⋮ | ⋮ | ⋮ |

COMMUNICATION APPARATUS

CROSS-REFERENCE TO RELATED APPLICATIONS

This application is based upon and claims the benefit of priority from the prior Japanese Patent Application No. 2012-097200 filed on Apr. 20, 2012, the entire contents of which are incorporated herein by reference.

FIELD

The embodiments disclosed herein are related to a communication apparatus.

BACKGROUND

An identifier (ID) locator separation technology has been available as a technology in which identifiers (addresses) on the Internet are managed separately in a core network and an access network to reduce the size of a routing table. A typical example of the ID-locator separation technology is Locator/ID Separation Protocol (LISP) and, in recent years, the standardization thereof is under consideration at the Internet Engineering Task Force (IETF).

FIG. 1 is a block diagram illustrating an overview of a network system employing the LISP in related art. This network system employing the LISP includes a core network 1 and one or more access networks 2 (three access networks 2a, 2b, and 2c are illustrated in FIG. 1 by way of example), which are coupled to the core network 1. The core network 1 in this case is, for example, a backbone network. The access networks 2 are, for example, user networks (networks at corporations or the like). As illustrated in FIG. 1, the core network 1 in the LISP includes, at least logically, a data plane 11 (a data-system communication network) and a control plane 12 (a control-system communications network).

Access lines of the access networks 2 are accommodated in corresponding transfer apparatuses (relay apparatuses), which are called "edge nodes 4". The edge nodes 4 are, in turn, coupled to the data plane 11 in the core network 1. The access networks 2 are accommodated in the respective different edge nodes 4. FIG. 1 illustrates an example including an edge node 4a that accommodates an access line from a host 3a in the access network 2a, an edge node 4b that accommodates an access line from a host 3b in the access network 2b, and an edge node 4c that accommodates an access line from a host 3c in the access network 2c.

Herein, identifiers (IDs) represent the identifiers of the hosts 3 that couple to the corresponding access networks 2. In FIG. 1, the ID of the host 3a, the ID of the host 3b, and the ID of the host 3c are assumed to be ID1, ID2, and ID3, respectively. Locators (LOCs) are identifiers indicating, in the core network 1, the locations of the hosts 3 that couple to the access networks 2 and correspond to, in the core network 1, the identifiers of the edge nodes 4. In FIG. 1, the LOC of the edge node 4a, the LOC of the edge node 4b, and the LOC of the edge node 4c are assumed to be LOC1, LOC2, and LOC3, respectively. The IDs may be called endpoint identifiers (EIDs) and the LOCs may be called routing locators (RLOCs). Since IP addresses are typically used as the IDs and LOCs, IP addresses are also used herein but other identifiers may also be used as the IDs and LOCs.

In the example in FIG. 1, the ID2 is assumed to be an IP address "A.B.10.11" (A and B are each an arbitrary integer from 0 to 255). The access network 2b is assumed to have a mask length of 16 bits. In this case, the address range of the access network 2b is "A.B.0.0/16". In FIG. 1, the ID3 is assumed to be an IP address "C.D.128.22" (C and D are each an arbitrary integer from 0 to 255). The access network 2c is also assumed to have a mask length of 24 bits. In this case, the address range of the access network 2c is "C.D.128.0/24".

In the LISP, in the core network 1 (that is, on the data plane 11), packets are relayed based on the LOCs and, in the access network 2, packets are relayed based on the IDs. In order to implement the packet relay in the LISP, one or more management servers 6 that manage relations between the IDs and the LOCs are provided at a gateway or gateways of the core network 1 (that is, the control plane 12). In FIG. 1, there are provided a management server 6a for the edge node 4a, a management server 6b for the edge node 4b, and a management server 6c for the edge node 4c.

In this case, although the IP address, which is the ID of the individual host 3, may be registered with the corresponding management server 6, an address range of aggregated IDs of the hosts 3 below the management server 6 (that is, a group of IP addresses with masks) may also be registered. In the latter case, the number of entries registered can be reduced. For example, as illustrated in FIG. 1, "A.B.0.0/16", which is the address range of the access network 2b below the edge node 4b, and the LOC (LOC2) of the edge node 4b are registered with the management server 6b in association with each other. Also, "C.D.128.0/24", which is the address range of the access network 2c below the edge node 4c, and the LOC (LOC3) of the edge node 4c are registered with the management server 6c in association with each other.

A basic operation of the LISP will be described with reference to FIG. 1. An operation of a case in which the host 3a (ID1) transmits data to the host 3b (ID2) will be described by way of example. The host 3a transmits, to the access network 2a, a packet containing data to which a header designating the ID (ID2) of the host 3b as its destination address is added (this packet is referred to as a "user IP packet"). The user IP packet is transmitted from the host 3a to the edge node 4a directly or via a router (a relay apparatus, not illustrated) (S1). Upon receiving the user IP packet, the edge node 4a encapsulates the user IP packet and transmits, through the data plane 11, the encapsulated packet to the edge node 4b that accommodates the host 3b that is the destination (ID2) of the of the user IP packet. At this point, the edge node 4a queries about the edge node 4b, which accommodates the host 3b, via the management server 6a on the control plane 12, as appropriate.

Now, a detailed description will be given of processing from when the edge node 4a receives the user IP packet until it encapsulates the user IP packet and transmits the encapsulated packet. When the edge node 4a does not know the address (LOC) of the edge node 4b that accommodates the host 3b that is the destination of the user IP packet (this case will be specifically described below), the edge node 4a transmits a LOC request message for querying about the LOC corresponding to the host 3b (ID2) to the management server 6a (S2). Upon receiving the LOC request message, the management server 6a relays the LOC request message to the management server 6b that manages the LOC2 corresponding to the destination address (ID2) contained in the LOC request message. The LOC request message is relayed on the control plane 12 directly or via control-system relay nodes 7 (relay apparatuses) as illustrated in FIG message is subjected to route control (routing), which is not described in this case, based on a control-system route table illustrated in FIG. 1. Upon receiving the LOC request message, the management server 6b recognizes the LOC2 corresponding to the destination (ID2) requested by the LOC request message, on the basis of the above-described registered address relation. The management server 6b then transmits, to the edge node 4a that is the source of the LOC request message, a LOC response message that contains the ID2 and the LOC2 related with each other (S4).

Upon receiving the LOC response message, the edge node 4a regards the user IP packet, received from the host 3a, as payload to generate an encapsulated packet (a LISP packet) in which a new IP header is added to outside the payload and transmits the encapsulated packet to the core network 1 (the data plane 11). On the basis of the received LOC response message, the edge node 4a sets the LOC2 for the destination address in the newly added IP header. The LISP packet is transferred on the data plane 11 directly or via relay nodes 5 (relay apparatuses) as illustrated in FIG. 1 and arrives at the edge node 4b (LOC2) (S5). The relay of the LISP packet is subjected to route control (routing), which is not described in this case, based on a route table (not illustrated). The edge node 4b removes (decapsulates) the outer IP header from the LISP packet and transmits the resulting user IP packet to the access network 2b. The destination address in the user IP packet is the ID2 set by the host 3a. Thus, the user IP packet is relayed from the edge node 4b directly or via a router (a relay apparatus, not illustrated) and arrives at the host 3b (ID2) (S6). As a result of the above-described processing, the transmission of the data from the host 3a (ID1) to the host 3b (ID2) on the basis of the LISP is completed.

In the LISP, the addresses (IDs) in the access networks 2 and the addresses (LOCs) in the core network 1 are separately managed as described above. That is, when viewed from the core network 1, the addresses (IDs) of all hosts 3 in one access network 2 are aggregated into the core network 1 address (LOC) of the edge node 4 to which the access network 2 couples. In other words, the relay nodes 5 in the core network 1 do not have to be conscious about the address system in each access network 2. Thus, the use of the LISP makes it possible to reduce the size of routing tables in the core network 1.

In general, when a LOC request message is transmitted each time a packet (a user IP packet) is received from the host 3a, the amounts of load on both of the edge node 4a and the entire network system are large. Thus, the edge node 4a holds a cache table (referred to as a "LOC cache table") in which the IDs and LOCs of the destination hosts 3 are related with each other. For example, in FIG. 1, "A.B.128.22/24, LOC3", which is an entry corresponding to the host 3c (ID3), is registered in the LOC cache table in the edge node 4a. Upon receiving a user IP packet from the host 3a, the edge node 4a searches the LOC cache table by using the destination address of the user IP packet as a search key. When the destination address does not match any of entries in the LOC cache table (this situation refers to a case in which the edge node 4a does not know the LOC), the edge node 4a transmits a LOC request message in order to query about the LOC, as described above. On the other hand, when the destination address matches any of the entries in the LOC cache table (this situation refers to a case in which the edge node 4a knows the LOC), the edge node 4a transfers the received packet to the edge node 4 by using the LOC in the matching entry without transmitting a LOC request message. With this arrangement, it is possible to reduce various types of load involved in query of the LOCs.

Examples of the related art include Japanese National Publication of International Patent Application No. 2002-506302 and Japanese Laid-open Patent Publication No. 2004-23450.

Other examples of the related include D. Farinacci, V. Fuller, D. Meyer, D. Lewis, cisco Systems, "Locator/ID Separation Protocol (LISP) draft-ietf-lisp-22", Feb. 12, 2012 and V. Fuller, D. Farinacci, D. Meyer, D. Lewis, Cisco "LISP Alternative Topology (LISP+ALT), draft-ietf-lisp-alt-10", Dec. 6, 2011.

SUMMARY

According to an aspect of the invention, a communication apparatus that couples to a core network in a network system including the core network, a first access network coupled to the core network via a first relay apparatus, and a second access network coupled to the core network via a second relay apparatus, the communication apparatus including: a memory; a processor configured to store, when a first packet is transmitted to a first destination address included in a first address range and not included in a second address range, cache information regarding the second address range to the memory, the first address range being assigned to the first access network and the second address range being assigned to the second access network and being included in the first address range; and a transmitter configured to transmit, when a second packet for a second destination address included in the second address range is generated, the second packer to the second relay apparatus based on the cache information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 9A and 9B illustrate one example of a LOC cache table and an exclusion LOC cache table in the communication system in the first embodiment;

FIGS. 10A and 10B illustrate one example of a LOC request message and a LOC response message in the communication system in the first embodiment;

FIG. 13 illustrates one example of an ID-LOC registration message in the communication system in the first embodiment;

FIG. 15 is a diagram illustrating one example of a control-system route table in the communication system in the first embodiment;

FIG. 16 is a diagram illustrating one example of, in the communication system in the first embodiment, a LOC request message to which route information is added;

DESCRIPTION OF EMBODIMENTS

Figure 1:
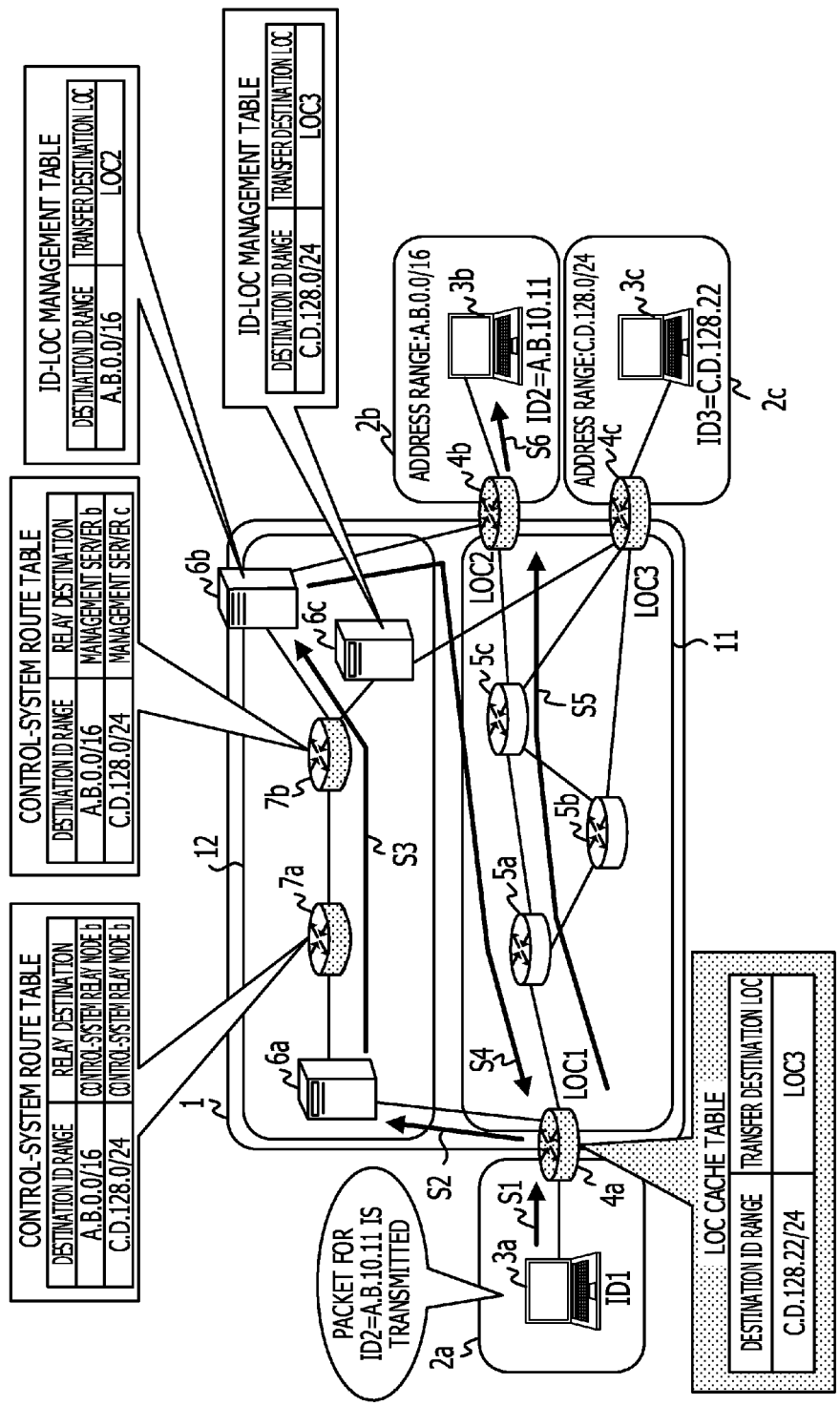
FIG. 1 is a diagram illustrating an overview of a LISP system in related art.

It is desired that the size of (the number of entries in) a LOC cache table held by an edge node 4 be smaller in a communication system employing a LISP. This is because an increase in the size of the LOC cache table causes an increase in the amount of memory used by the edge node 4 to thereby increase the cost. A further reason is that it takes a long time to search the LOC cache table to thereby increase the amount of processing delay and also the amount of transmission delay.

However, as described above, in the communication system in the related art employing the LISP, an entry in the LOC cache table is stored for each host. Accordingly, it is deemed that, in the system in the related art, the number of entries in the LOC cache table in the edge node 4 increases significantly (it is to be noted that this situation has nothing to do with the above-described concept that the size of the routing table in a core network 1 is suppressed by the LISP). In short, the number of entries in the LOC cache table in the system in the related art corresponds to the number of all hosts accessible through the Internet. This is so impractical.

It is, therefore, desired that the number of entries in the LOC cache table be reduced in a communication system employing the LISP. For example, one conceivable method is to set an upper limit for the number of entries in the LOC cache table. Such a method, however, causes a reduction in the cache hit rate to increase the amount of processing delay in the system, which is not preferable.

As described above, a practical communication system that employs the LISP and that can reduce the number of entries in the LOC cache table has not been proposed until now.

The disclosed technology has been made in view of the foregoing situation and one object of the disclosed technology is to provide a communication apparatus that can reduce the number of entries in the LOC cache table in a practical communication system employing the LISP.

A disclosed communication system, a communication apparatus, and a communication method according to embodiments will be described below with reference to the accompanying drawings. Although a description is given in connection with independent embodiments for the sake of simplicity, it goes without saying that combination of the embodiments can provide combinational effects to further enhance availability and usability.

The so-called "Classless Inter-Domain Routing (CIDR) notation" will be mainly used hereinafter to represent the range of IP addresses in a network or sub-networks. As one example, an IP address in the range of "A.100.10.0" to "A.100.10.255" can be represented as "A.100.10.0/24" with the CIDR notation (A is an integer from 0 to 255). In this case, "A.100.10.0" is generally called a "network address". Also, "24" is the bit length of a netmask indicating the range of addresses in a network and is called a "mask length".

Incidentally, the range of IP addresses defined by the CIDR notation can also be represented by a set of a network address and a netmask. For example, the IP address range of "A.100.10.0" to "A.100.10.255" can be represented by a set of a network address "A.100.10.0" and a netmask 255.255.255.0 (A is an integer from 0 to 255). The CIDR notation and a representation using a set of a network address and a netmask can easily be inter-converted. Thus, those notation and representation may be interchangeably applied in the following description. It is also to be noted that any of the notation and the representation may be used to implement the disclosed communication system and so on.

[a] Cause of Problem

Before the disclosed communication system, communication apparatus, and communication method according to embodiments are described below, a description will be given of a cause of a problem that can occur in the related art. This problem has been found through intensive studies by the present inventors with respect to the related art and has not been recognized heretofore.

As described above, the LISP system in the related art has a problem in that the size of the LOC cache table increases significantly when the number of communication destinations increases. This problem is due to the fact that an entry in the LOC cache table in the related art is stored for each host. Thus, a possible simple solution to the problem is that an entry in the LOC cache table is stored for each network (access network). However, when that solution is employed, another problem arises, that is, the LOC cache table is not appropriately searched under a certain condition and a packet does not arrive at its destination (which is herein referred to as "packet non-arrival"). This new problem will be described below.

FIGS. 2 to 5 are diagrams illustrating the new problem in the related art. A network illustrated in FIGS. 2 to 5 is similar to the network illustrated in FIG. 1, but is different in that the address range of an access network 2c is changed to "A.B.128.0/24". In addition, the address (ID3) of a host 3c that couples to the access network 2c is changed to "A.B.128.22".

In the network in FIGS. 2 to 5, there is a relationship that the address range "A.B.128.0/24" of the access network 2c is included in the address range "A.B.0.0/16" of the access network 2b. More specifically, since the network address of the access network 2c is "A.B.128.0" and the netmask thereof is 24 bits, the address range of the access network 2c is "A.B.128.X" (X can assume an integer from 0 to 255). Since the network address of the access network 2b is "A.B.0.0" and the netmask thereof is 16 bits, the address range is "A.B.Y.Z" (Y and Z can each assume an integer from 0 to 255). In this case, of the address range of the access network 2b, an address range of Y=128 is the address range of the access network 2c.

That is, the address range of the access network 2b includes the address range of the access network 2c.

Such a network configuration can generally exist on the Internet. For example, such a network configuration can exist when one user network (for example, the access network 2) is separated into physically independent sub-networks (for example, a sub-network at a headquarters in Tokyo and a sub-network at a branch office in Osaka). Another example in which such a network configuration can exist is a case in which an internet service provider (ISP) or the like partially leases an IP address range, assigned to the ISP, to another party.

In a network as illustrated in FIGS. 2 to 5, the above-described new problem may occur. For understanding the problem, two cases (case 1 and case 2) in the system in the related art will be described below in order.

Figure 2:
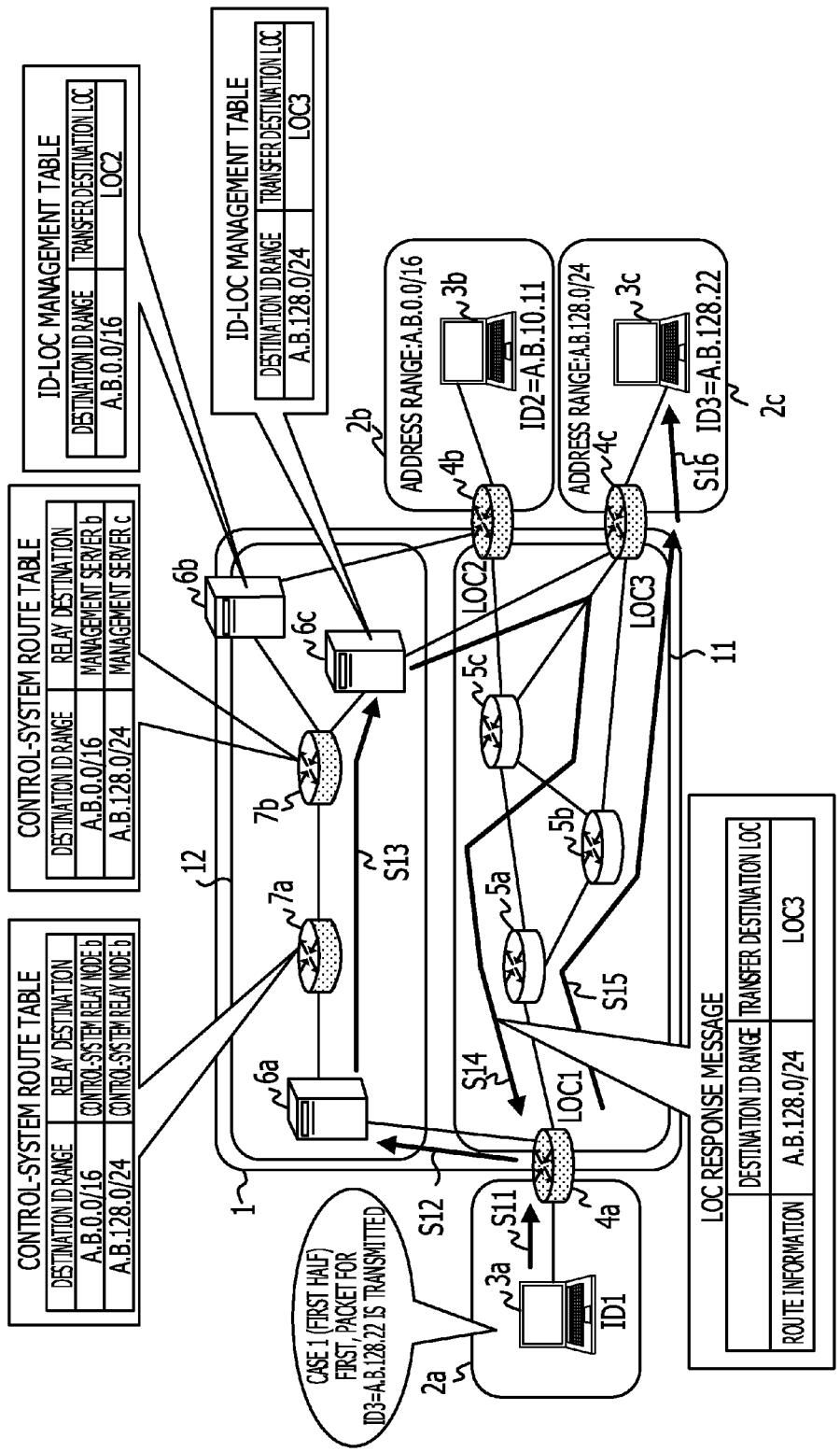
FIG. 2 is a diagram illustrating a problem (in a first half of case 1) of the LISP system in the related art.
Figure 3:
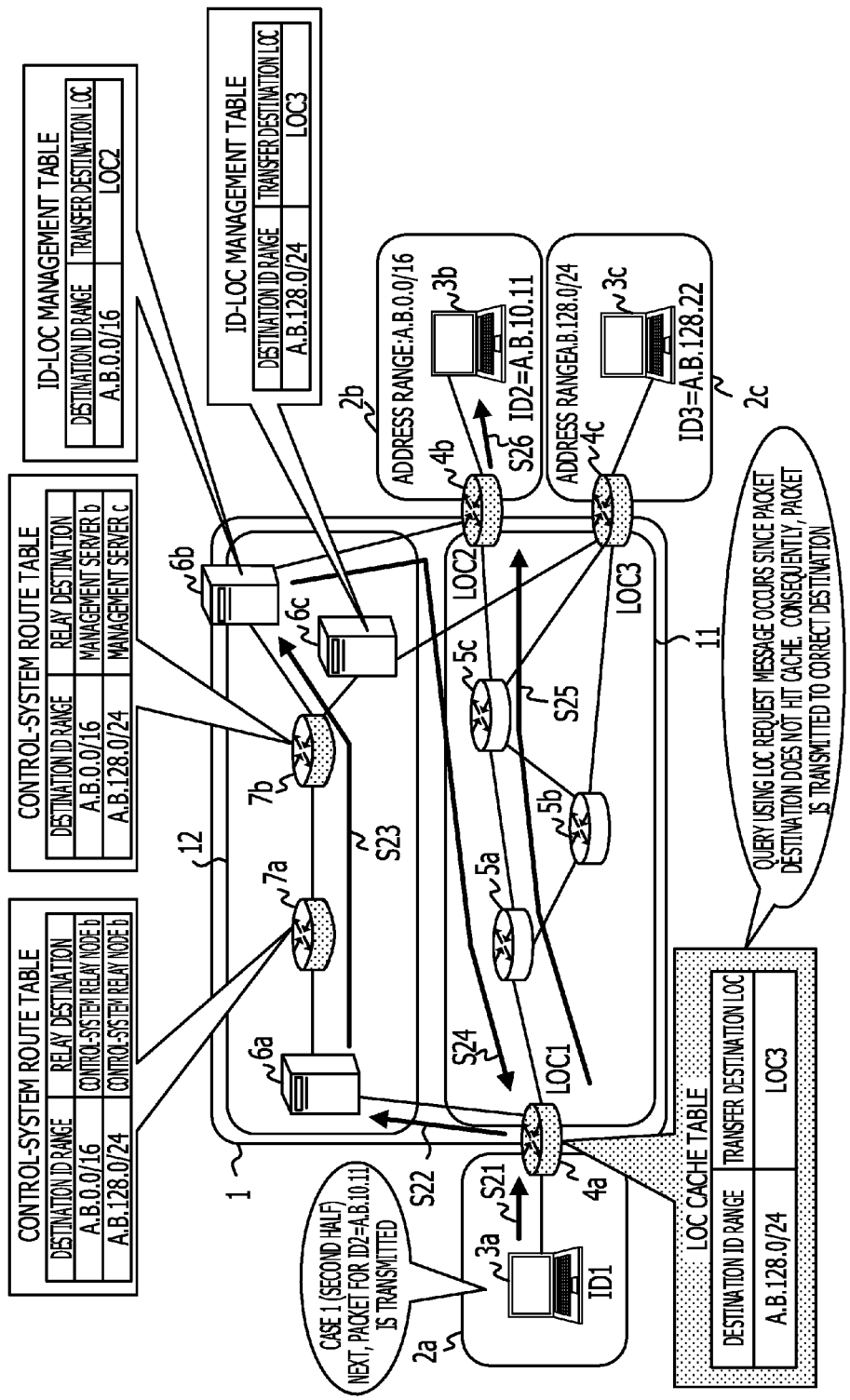
FIG. 3 is a diagram illustrating a problem (in a second half of case 1) of the LISP system in the related art.

First, case 1 will be described with reference to FIGS. 2 and 3. As illustrated in FIG. 2, case 1 corresponds to a case in which a communication first occurs from a host 3a (ID1) to the host 3c (ID3=A.B.128.22) and then a communication occurs from the host 3a (ID1) to a host 3b (ID2=A.B.10.11), as illustrated in FIG. 3.

In FIG. 2, first, the host 3a (ID1) transmits a packet for the host 3c (ID3=A.B.128.22) and an edge node 4a receives the packet (S11). It is assumed that that the LOC cache table in the edge node 4a is empty in this case. Upon receiving the edge node 4a transmits a LOC request message for querying about the ID3 to a management server 6a (S12). The LOC request message is relayed through a control plane 12 and then arrives at a management server 6c (S13). In response to the received LOC request message, the management server 6c sends back a LOC response message containing "A.B.128.0/24, LOC3" or "A.B.128.22/24, LOC3" on the basis of an ID-LOC management table (S14).

In this case, although the ID3 (=A.B.128.22) also matches "A.B.0.0/16" in a control-system route table included in a control-system relay node 7b illustrated in FIG. 2 (since the top 16 bits of the ID3 is "A.B"), a LOC response message is not sent back from the management server 6b. This is due to the effect of the longest match rule, which is an IP-address matching rule for the Internet. According to the longest match rule, when a packet relay apparatus such as a router searches the route table or the like by using an IP address and the IP address matches multiple entries, an entry having the largest mask length is a matching entry. For example, in the case in FIG. 2, when the control-system relay node 7b searches the route table by using the ID3 (=A.B.128.22), it matches both of the entry of "A.B.0.0/16" and the entry of "A.B.128.0/24". In this case, according to the longest match principle, "A.B.128.0/24", which is an entry having the longest mask length (24>16), is a matching entry. Thus, the control-system relay node 7b transfers a LOC request message to the management server 6c, not to the management server 6b. As a result, a LOC response message is sent back from the management server 6c (not from the management server 6b) to the edge node 4c (LOC3).

In FIG. 2, upon receiving the LOC response message from the management server 6c, the edge node 4a encapsulates the received packet for the ID 3 to generate a LISP packet and transmits the LISP packet to the core network 1 (a data plane 11). At this point, the LOC3 is set for the destination address of the LISP packet on the basis of the received LOC response message. After being relayed through the data plane 11, the LISP packet arrives at the edge node 4c (LOC3) (S15). The edge node 4c decapsulates the LISP packet and transfers the LISP packet to the host 3c (ID3) (S16). As a result of the above-described processing, the packet transmission from the host 3a (ID1) to the host 3c (ID3) is completed.

On the other hand, in FIG. 2, upon receiving the LOC response message "A.B.128.0/24, LOC3" or "A.B.128.22/24, LOC3", the edge node 4a registers an entry into the LOC cache table on the basis of the received LOC response message. In this case, although an entry in each LOC cache table in the LISP system illustrated in FIG. 1 is stored for each host 3, the present technology is based on the premise that an entry in each LOC cache table in the LISP system illustrated in FIGS. 2 to 5 is stored for each access network (for example, for each network or sub-network). Accordingly, in the example illustrated in FIGS. 2 to 5, an address range (referred to as a "destination ID range") in the access network, not for each host, is stored with respect to the destination ID in the LOC response message. On the basis of the received LOC response message "A.B.128.0/24, LOC3" or "A.B.128.22/24, LOC3" for the corresponding access network, the edge node 4a registers the entry "A.B.128.0/24, LOC3" or "A.B.128.22/24, LOC3" for the corresponding access network into the LOC cache table.

Case 1 will be further described with reference to FIG. 3. In case 1, next, a communication occurs from the host 3a (ID1) to the host 3b (ID2=A.B.10.11).

In FIG. 3, the host 3a (ID1) transmits a packet for the ID2 (S21). Upon receiving the packet for the ID2, the edge node 4a searches the LOC cache table by using the ID2 as a search key. In this case, as illustrated in FIG. 3, only a previously registered entry "A.B.128.0/24, LOC3" exists in the LOC cache table in the edge node 4a. In this case, the ID2 (=A.B.10.11) does not match the entry "A.B.128.0/24, LOC3". That is, since an entry that matches "A.B.10.11" is not registered in the LOC cache table, no matching entry is found in the searching by the edge node 4a. Thus, the edge node 4a transmits a LOC request message based on the ID2 to the control plane 12 (S22). After being relayed through the control plane 12, the LOC request message arrives at the management server 6b (S23). The management server 6b sends back a LOC response message containing "A.B.0.0/16, LOC2" or "A.B.10.11/16, LOC2" (S24). The edge node 4a encapsulates the previously received packet for the ID2 to generate a LISP packet. On the basis of the received LOC response message, the edge node 4a transmits the LISP packet to the edge node 4b (LOC2) corresponding to the LOC2 (S25). The edge node 4b decapsulates the received LISP packet and transfers the resulting data to the host 3b (ID2) (S26). As a result of the above-described processing, the packet transmission from the host 3a (ID1) to the host 3b (ID2) is completed.

When the edge node 4a illustrated in FIG. 3 receives the LOC response message, the edge node 4a registers "A.B.0.0/16, LOC2" or "A.B.10.11/16, LOC2" into the LOC cache table. It is to be noted that, in this case, an entry is also registered into the LOC cache table for each access network. As a result, two entries "A.B.0.0/16, LOC2" and "A.B.128.0/24, LOC3" or "A.B.10.11/16, LOC2" and "A.B.128.22/24, LOC3" are registered in the LOC cache table.

As described above with reference to FIGS. 2 and 3, in case 1 (a case in which a communication first occurs from the host 3a to the host 3c and then a communication occurs from the host 3a to the host 3b), both of a packet for the host 3c (ID3) and a packet for the host 3b (ID2) which are transmitted from the host 3a (ID1) are properly received by the destinations even if an entry in the LOC cache table is stored for each access network. That is, in case 1, the LISP system operates appropriately and a problem, such as the packet non-arrival, does not particularly occur.

Figure 4:
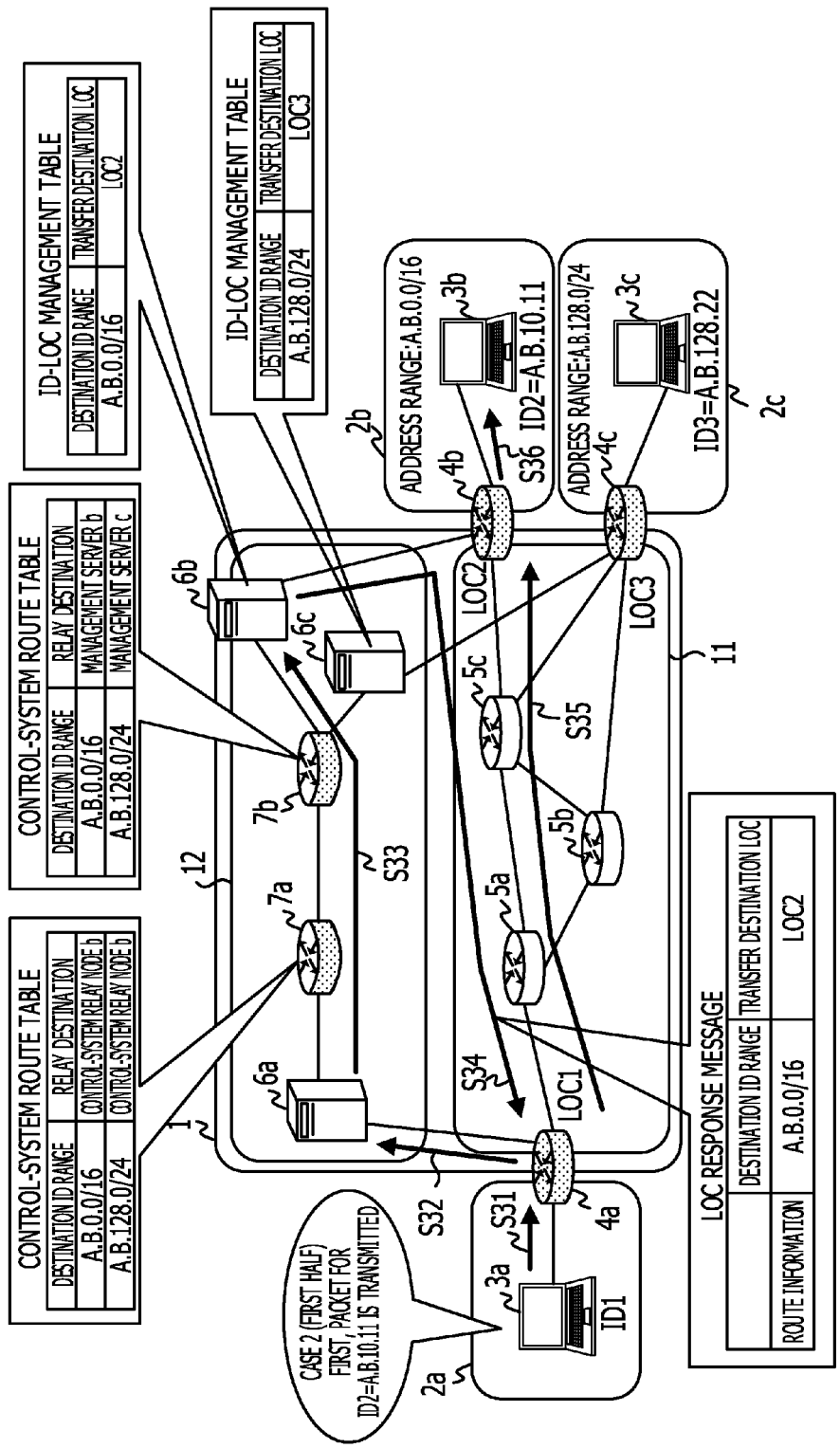
FIG. 4 is a diagram illustrating a problem in (in a first half of case 2) of the LISP system in the related art.
Figure 5:
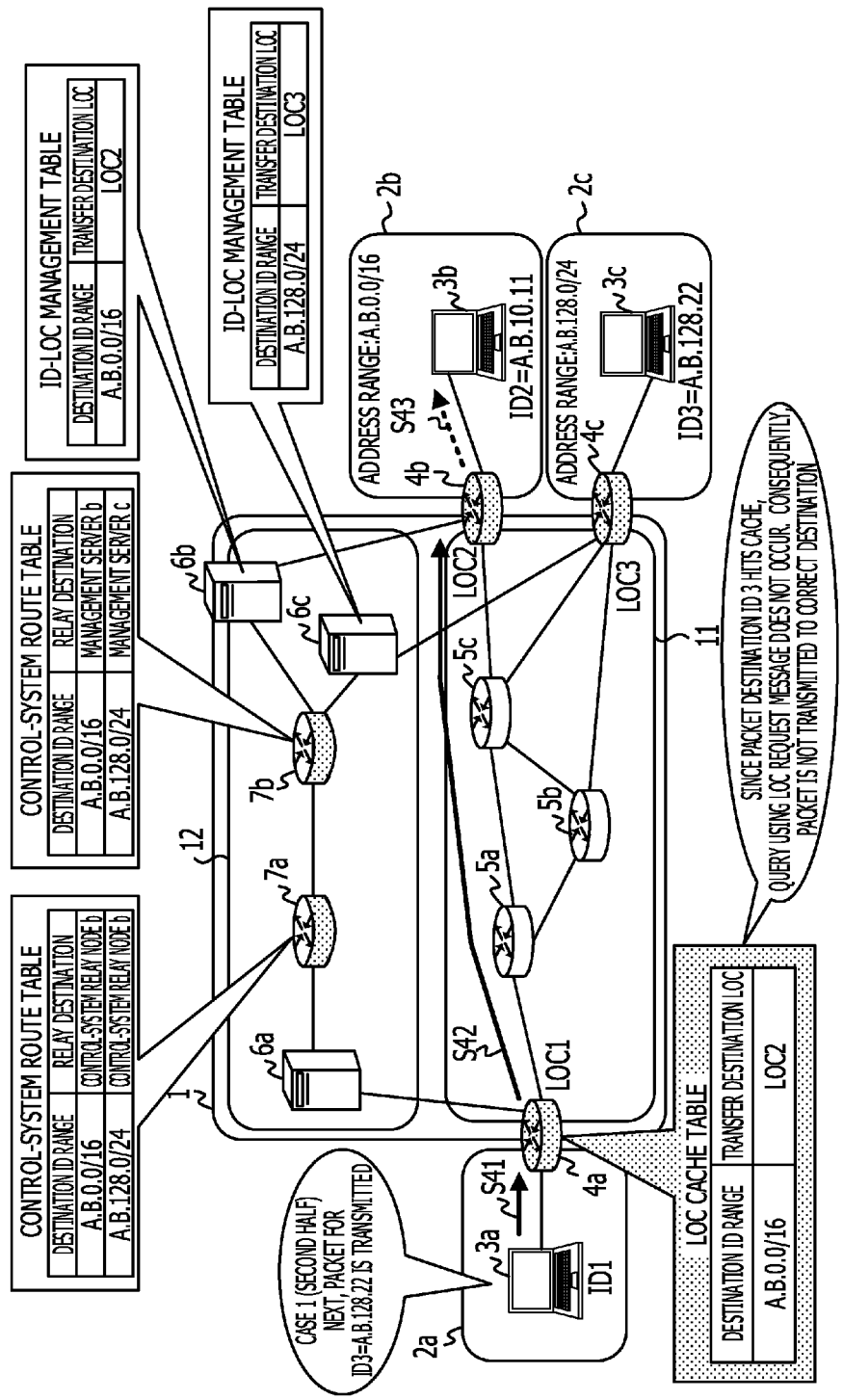
FIG. 5 is a diagram illustrating a problem (in a second half of case 2) of the LISP system in the related art.

Next, case 2 will be described with reference to FIGS. 4 and 5. Case 2 corresponds to a case in which a communication first occurs from the host 3a (ID1) to the host 3b (ID2=A.B.10.11), as illustrated in FIG. 4, and then a communication occurs from the host 3a (ID1) to the host 3c (ID3=A.B.128.22), as illustrated in FIG. 5. Only a difference of case 2 from case 1 is that the communications occur in an opposite order.

In FIG. 4, first, the host 3a (ID1) transmits a packet for the host 3b (ID2=A.B.10.11) and the edge node 4a receives the packet (S31). It is assumed that the LOC cache table in the edge node 4a is empty in this example. Thus, the edge node 4a transmits a LOC request message for querying about the ID2 to the management server 6a (S32). After being relayed through the control plane 12, the LOC request message arrives at the management server 6b (S33). In this case, in route searching by the control-system relay node 7b, the ID2 (=A.B.10.11) matches only "A.B.0.0/16" and does not match "A.B.128.0/24". As a result, without having to apply the longest match rule, the control-system relay node 7b recognizes "A.B.0.0/16" as a matching entry and transfers a LOC request message to the management server 6b.

In FIG. 4, in response to the received LOC request message, the management server 6b sends back a LOC response message containing "A.B.0.0/16, LOC2" or "A.B.10.11/16, LOC2" on the basis of the ID-LOC management table (S34). Upon receiving the LOC response message from the management server 6b, the edge node 4a encapsulates the received packet for the ID2 to generate a LISP packet and transmits the LISP packet to the core network 1 (that is, the data plane 11). In this case, the LOC2 is set for the destination address in the LISP packet on the basis of the received LOC response message. After being relayed through the data plane 11, the LISP packet arrives at the edge node 4b (LOC2) (S35). The edge node 4b decapsulates the LISP packet and transfers the resulting data to the host 3b (ID2) (S36). As a result, the packet transmission from the host 3a (ID1) to the host 3b (ID2) is completed.

In addition, upon receiving the LOC response message, the edge node 4a in FIG. 4 registers "A.B.10.11/16, LOC2" or "A.B.0.0/16, LOC2" into the LOC cache table on the basis of the received LOC response message. It is to be noted that, in this case, an entry is also registered into the LOC cache table for each access network.

Case 2 will further be described with reference to FIG. 5. In case 2, next, a communication occurs from the host 3a (ID1) to the host 3c (ID3=A.B.128.22).

In FIG. 5, the host 3a (ID1) transmits a packet for the host 3c (ID3=A.B.128.22) (S41). Upon receiving the packet for the ID3, the edge node 4a searches the LOC cache table by using the ID3 as a search key. At this point, as illustrated in FIG. 5, only a previously registered entry "A.B.0.0/16, LOC2" exists in the LOC cache table in the edge node 4a. In this case, the ID3 (=A.B.128.22) matches the entry "A.B.0.0/16, LOC2". That is, in the searching of the LOC cache table by using the ID3 as a search key, the entry "A.B.0.0/16, LOC2" is retrieved as a matching entry.

Since the matching entry is found in the searching of the LOC cache table, the edge node 4a performs processing for transferring the received packet without transmitting a LOC request message. Thus, the edge node 4a encapsulates the received packet for the ID3 to generate a LISP packet and transmits the LISP packet to the core network 1 (the data plane 11). In this case, the LOC2 is set for the destination address of the LISP packet on the basis of the found matching entry. After being relayed through the data plane 11, the LISP packet arrives at the edge node 4b (LOC2) (S42). The edge node 4b decapsulates the LISP packet to obtain the packet for the ID3. Although the edge node 4b relays the packet for the ID3 to the access network 2b, the host 3c (ID3) does not exist in the access network 2b. Consequently, the packet for the ID3 does not arrive at the host 3c (ID3).

As described above with reference to FIGS. 4 and 5, in case 2 (a case in which a communication first occurs from the host 3a to the host 3b and then a communication occurs from the host 3a to the host 3c), a packet for the host 3b (ID2) transmitted from the host 3a (ID1) is properly received by the destination, but a packet for the host 3c (ID3) subsequently transmitted from the host 3a (ID1) is not received. That is, the packet non-arrival occurs in case 2.

The packet non-arrival in case 2 is possibly due to the arrangement in which an entry in the LOC cache table is stored for each access network. That is, the packet non-arrival can occur since the arrangement in which an entry is stored for each access network can cause a case in which an entry that is not supposed to be retrieved is found as a matching entry in searching of the LOC cache table. For example, in FIG. 5, a packet for the ID3 (=A.B.128.22) is supposed to be transferred to the LOC3. Thus, the ID3, which is not supposed to match the entry "A.B.0.0/16, LOC2" in the LOC cache table, matches it in practice. The reason why such false retrieval occurs is that an entry in the LOC cache table is stored for each access network.

However, even when an entry in the LOC cache table is stored for each access network, there are cases in which such false retrieval does not occur. Such false retrieval can occur when the address range of one access network (for example, the access network 2b in the above-described example) is partially used by another access network (for example, the access network 2c in the example) as in the exemplary case illustrated in FIGS. 2 to 5. When false retrieval from the LOC cache table occurs, a LISP packet, which is an encapsulated packet, is erroneously transmitted to a wrong transfer destination (LOC) in the core network 1. Consequently, the packet does not arrive at a proper destination (ID).

In summary, the problem still remains with the simple method in which an entry is stored for each access network in order to reduce the number of entries in the LOC cache table. That is, with that method, there are cases in which the LOC cache table is not appropriately searched and the packet non-arrival occurs (for example, as in case 2). A description below will be given of a communication system that overcomes the problem.

[b] First Embodiment

Figure 6:
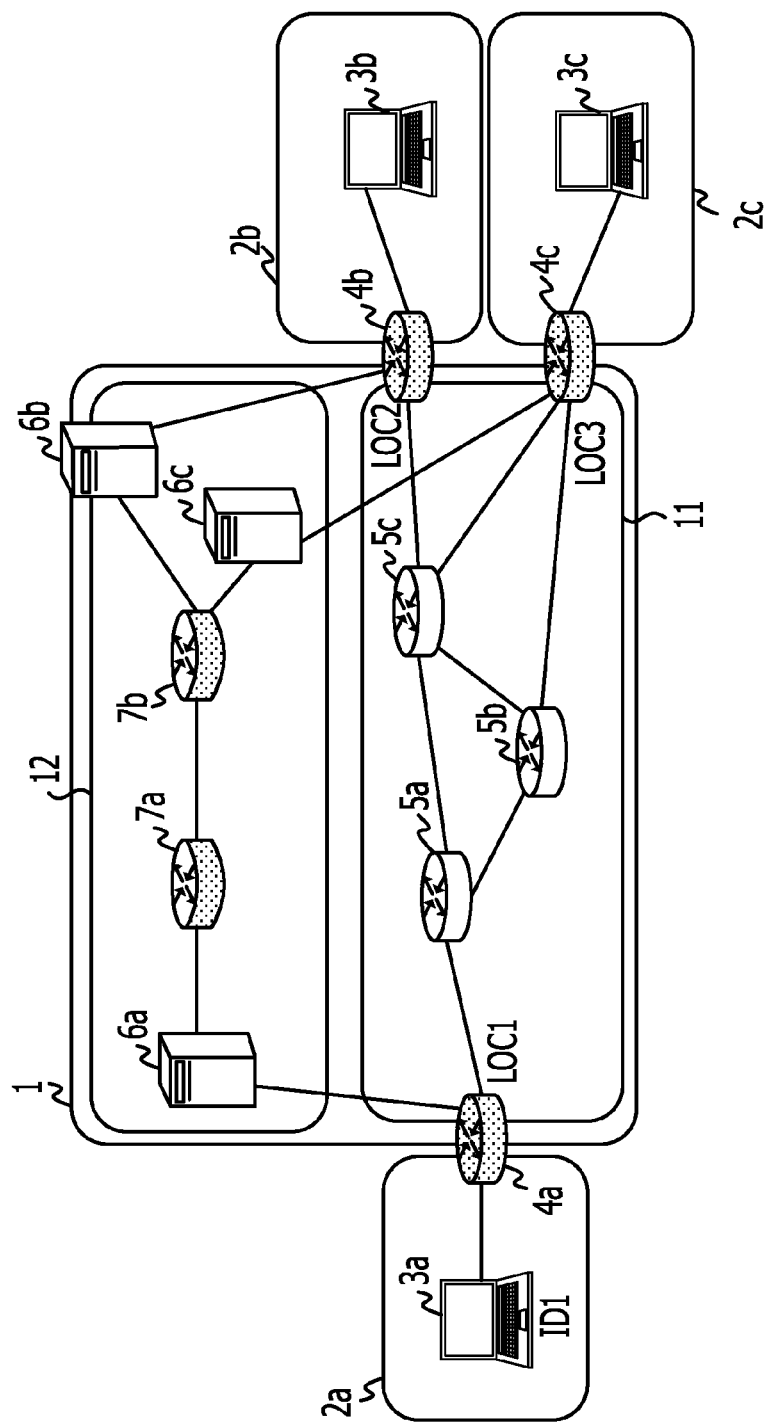
FIG. 6 is a diagram illustrating one example of the network configuration of a communication system in a first embodiment.

FIG. 6 illustrates one example of the network configuration of a communication system in the first embodiment. The communication system in this embodiment is compliant with the LISP. Thus, some terms and concepts that are specific to the LISP are used below. It is, however, to be noted that the present embodiment is merely an example and is also applicable to a communication system that complies with a control protocol akin to the LISP or a non-LISP control protocol similar to the LISP.

The communication system illustrated in FIG. 6 includes, for example, one core network 1 and three access networks 2.

A description will first be given of the access networks 2. The access networks 2 are networks in (to) which hosts 3, which are end nodes in data transmission/reception, are accommodated (coupled). In FIG. 6, three access networks 2a, 2b, and 2c are provided and the hosts 3a, 3b, and 3c are accommodated therein (coupled thereto).

The hosts 3 (end nodes) in the access networks 2 have unique apparatus identifiers (IDs), respectively. In this embodiment, IP addresses are used as the IDs. The IDs may or may not be IP addresses as long as they are unique identifiers in the networks. When a first one of the hosts 3 transmits data to a second one of the hosts 3, the first host 3 specifies the ID of the second host 3 as a destination to transmit a packet containing data. The ID of the first host 3 that transmits the data is specified as the transmission source of the packet. With this configuration, the packetized data can be communicated between the hosts 3.

The access networks 2 are coupled to the core network 1 through respective different edge nodes 4. In FIG. 6, three access networks 2a, 2b, and 2c are coupled to the core network 1 through the respective edge nodes 4a, 4b, and 4c. The edge nodes 4 are described later.

Next, a description will be given of the core network 1. The core network 1 has two networks (logical networks) called the data plane 11 (a data system) and the control plane 12 (a control system). The data plane 11 is a network through which data are transmitted and received in the LISP. The control plane 12 is a network through which control messages are transmitted and received in the LISP. In the core network 1, the control plane 12 and the data plane 11 may be implemented by physically independent networks or may be implemented by the same network. In addition, an apparatus on the control plane 12 and an apparatus on the data plane 11 may be physically independent apparatuses or may be a single apparatus.

A description will now be given of the data plane 11 in the core network 1. The data plane 11 includes the edge nodes 4 and relay nodes 5.

The edge nodes 4 are located at the boundaries between the core network 1 and the corresponding access networks 2 to couple the core network 1 and the access networks 2. Communications between the access networks 2 and the core network 1 are performed through the corresponding edge nodes 4. When a first one of the hosts 3 in a first one of the access networks 2 below one edge node 4 transmits a data packet to a second one of the hosts 3 in a second one of the access networks 2, the edge node 4 relays the data packet, received from the first host 3, to the core network 1. Also, when a data packet is transmitted from the second host 3 in the second access network 2 to the first host 3 in the first access network 2 below the edge node 4, the edge node 4 relays the data packet, received from the core network 1, to the first host 3 in the access network 2 below the edge node 4.

The edge nodes 4 are provided for the access networks 2, respectively. In the example in FIG. 6, three edge nodes 4 exist on the data plane 11 in the core network 1 and are coupled to the respective different access networks 2. The edge node 4a is coupled to the core network 1 and the access network 2a. The edge node 4b is coupled to the core network 1 and the access network 2b. The edge node 4c is coupled to the core network 1 and the access network 2c.

The individual edge nodes 4 have location identifiers (LOCs) indicating their locations in the core network 1. The LOCs may also be regarded as identifiers that represent, in the core network 1, the locations of all the hosts 3 (end nodes) that couple to the access networks 2 below the edge nodes 4. In this embodiment, the IP addresses of the edge nodes 4 at the core network 1 side are used as the LOCs. The LOCs may or may not be IP addresses as long as they are unique identifiers in the core network 1. In the example in FIG. 6, the LOC of the edge node 4a is a LOC1, the LOC of the edge node 4b is a LOC2, and the LOC of the edge node 4c is a LOC3.

A description herein will be given of an example in which data is transmitted from the host 3a in the access network 2a to the host 3b in the access network 2b or the host 3c in the access network 2c. That is, in the example described herein, the host 3a in the access network 2a serves as the source of a communication and the host 3b in the access network 2b or the host 3c in the access network 2c serves as the destination of the communication. Thus, in this embodiment, the edge node 4a that couples to the access network 2a is referred to as an "ingress edge node 4" or an "ingress edge node 4a". In addition, the edge node 4b that couples to the access network 2b and the edge node 4c that couples to the access network 2c are referred to as "egress edge nodes 4" or "egress edge nodes 4b and 4c", respectively. These terminologies are merely for the sake of convenience herein. In another embodiment, for example, if data is transmitted from the host 3b in the access network 2b to the host 3a in the access network 2a, then the edge node 4b that couples to the access network 2b serves as an ingress edge node 4b and the edge node 4a that couples to the access network 2a serves as an egress edge node 4a. Needless to say, one edge node 4 may be configured to have both of the functions such that it serves as an "ingress edge node 4" in one case and also serves as an "egress edge node 4" in another case.

A description will be given of the relay nodes 5 on the data plane 11 in the core network 1. Each relay node 5 receives a packet from an adjacent node (a next hop) and relays the packet to another adjacent node. The adjacent node may be the edge node 4 or may be another relay node 5. The relay nodes 5 correspond to typical router apparatuses. That is, each relay node 5 has a route table (a routing table). The relay node 5 determines an adjacent node (a next hop) that is the destination of a received packet, on the basis of the route table, and transmits the received packet to the relay destination.

Next, a description will be given of the control plane 12 in the core network 1. The control plane 12 has the management servers 6 and the control-system relay nodes 7.

The management servers 6 are apparatuses that manage the edge nodes 4 and are related therewith. The management servers 6 and the edge nodes 4 may have one-to-one relationship or may have another relationship. For the same reason as for the edge nodes 4, the management server 6a in FIG. 4 is referred to as an "ingress management server 6" or an "ingress management server 6a". The management servers 6b and 6c are also referred to as "egress management servers 6" or "egress management servers 6b and 6c", respectively.

Simply stated, each management server 6 is a node serving as an agency for query about a LOC request message in the core network 1. When the edge node 4 does not know a LOC corresponding to the destination address (ID) of a packet received from the host 3 below the edge node 4, the edge node 4 transmits a LOC request message for querying about a destination LOC to the management server 6 that manages the edge node 4. The management server 6 relays the received LOC request message to the control plane 12. The LOC request message is relayed, for example, through the control-system relay nodes 7 on the control plane 12 and arrives at the management server 6 for the access network 2 to which the destination host 3 belongs. The management server 6 sends back, as a LOC response message, the ID and the LOC of the host 3 requested by the LOC request message.

A description will now be given of the control-system relay nodes 7 on the control plane 12 in the core network 1. Each control-system relay node 7 receives a request message from an adjacent node (a next hop) and relays the LOC request message to another adjacent node. The adjacent node may be the management server 6 or may be another control-system relay node 7. The control-system relay node 7 has a route table (a routing table) as in a typical routing apparatus. The control-system relay node 7 determines an adjacent node (a next hop) that is the relay destination of the LOC request message, on the basis of the route table, and transmits the LOC request message to the relay destination.

Figure 7:
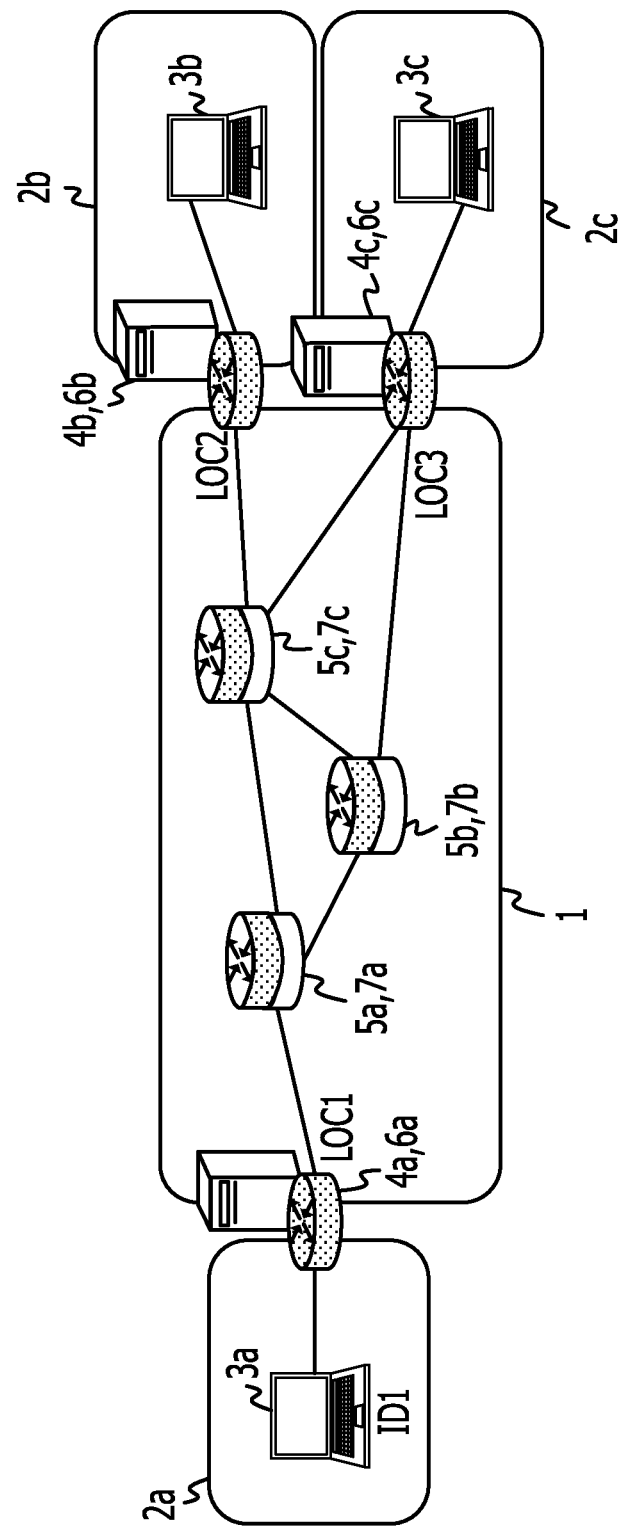
FIG. 7 is diagram illustrating another example of the network configuration of the communication system in the first embodiment.

As described above, in the core network 1, the control plane 12 and the data plane 11 may be implemented by physically the same network. An apparatus on the control plane 12 and an apparatus on the data plane 11 may also be physically individual apparatuses or may be a single apparatus. For example, one edge node 4 and one management server 6 may be physically the same apparatus (node). For example, one relay node 5 and one control-system relay node 7 may be physically the same apparatus (node). FIG. 7 illustrates an example in which the control plane 12 and the data plane 11 in the core network 1 in the network in FIG. 6 are implemented by physically a single network. In FIG. 7, one edge node 4 and one management server 6 are physically the same apparatus (node). One relay node 5 and one control-system relay node 7 are also physically the same apparatus (node).

Next, a detailed description will be given of the functions of the individual apparatuses in the network in FIG. 6.

Figure 8:
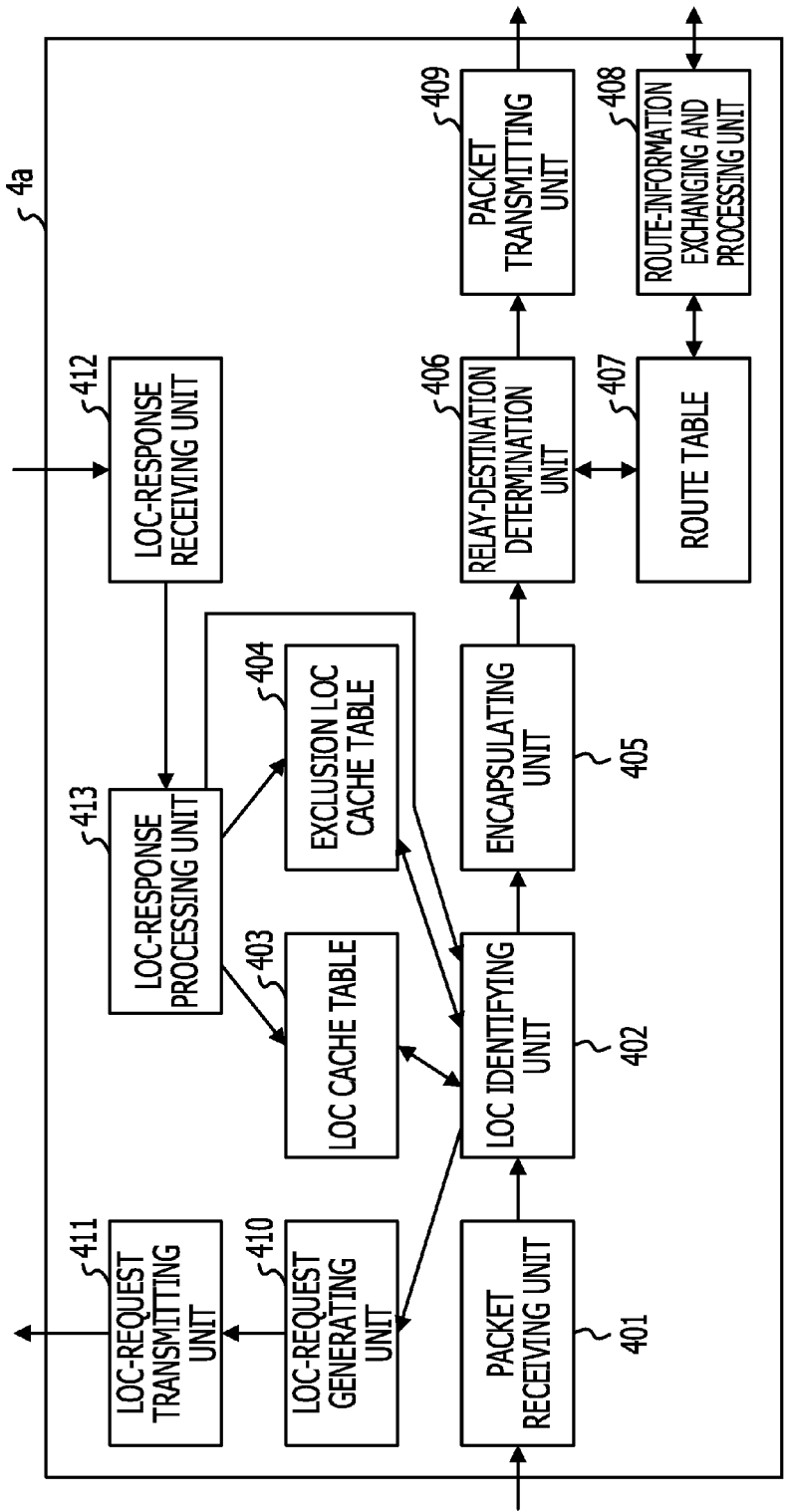
FIG. 8 illustrates one example of the functional configuration of an ingress edge node in the communication system in the first embodiment.

The ingress edge node 4a in the first embodiment will first be described with reference to FIGS. 8 to 10. FIG. 8 illustrates one example of the functional configuration of the ingress edge node 4a in the first embodiment. The ingress edge node 4a includes, for example, a packet receiving unit 401, a LOC identifying unit 402, a LOC cache table 403, an exclusion LOC cache table 404, an encapsulating unit 405, a relay-destination determination unit 406, a route table 407, a route-information exchanging and processing unit 408, a packet transmitting unit 409, a LOC-request generating unit 410, a LOC-request transmitting unit 411, a LOC-response receiving unit 412, and a LOC-response processing unit 413.

The packet receiving unit 401 receives an IP packet from the host 3 (end node) coupled to the access network 2 to which the ingress edge node 4a couples. The IP packet has an IP header and payload (data). The IP header contains the IP address (destination address) of the destination node 4 of the IP packet. The destination address corresponds to the ID of the destination node 4 of the IP packet. The packet receiving unit 401 inputs the received IP packet to the LOC identifying unit 402. The term "packet" as used hereinafter refers to an IP packet, unless otherwise particularly stated.

The LOC identifying unit 402 refers to the LOC cache table 403 and the exclusion LOC cache table 404 to identify the egress edge node 4b (LOC) that is the transfer destination of the packet received by the packet receiving unit 401. When the LOC identifying unit 402 fails to identify the egress edge node 4b that is the transfer destination of the packet, the LOC identifying unit 402 determines that a LOC request message is to be transmitted.

Now, a description will be given of the LOC cache table 403 and the exclusion LOC cache table 404 referred to by the LOC identifying unit 402.

FIG. 9A illustrates one example of the LOC cache table 403. Each entry in the LOC cache table 403 is information in which a "destination ID range" and a "transfer destination LOC" are related with each other. In addition, the "destination ID range" is represented by a set of a "network address" and a "mask length". The "network address" contains the network address of the access network 2. The "mask length" contains the mask length of the access network 2. The "transfer destination LOC" contains the LOC (the address of the egress edge node 4b) of the access network 2.

Simply stated, the LOC cache table 403 is a table indicating a relation between the IP address range (destination ID range) used by the corresponding access network 2 and the IP address (transfer destination LOC) of the egress edge node 4b that is the transfer destination of an IP packet for an IP address in that range. Unlike the LISP system in the related art, an entry in the LOC cache table 403 is created for each access network (that is, for each ID range), not for each host (each ID).

FIG. 9B illustrates one example of the exclusion LOC cache table 404. Each entry in the exclusion LOC cache table 404 indicates a "destination ID range". In addition, the "destination ID range" is represented by a set of a "network address" and a "mask length". The "network address" contains the network address of the access network 2. The "mask length" contains the mask length of the access network 2.

Simply stated, the exclusion LOC cache table 404 is a table that states an IP addresses range (destination ID range) for which transfer destination LOCs are not be determined based on the LOC cache table 403. Unlike the LOC cache table 403, the IP address range (destination ID range) stated by the exclusion LOC cache table 404 indicates an IP address range for which transfer destination LOCs are not be determined based on the LOC cache table 403. An entry for the exclusion LOC cache table 404 is also created for each access network 2, as in the case of the LOC cache table 403.

Now, a description will be given of the LOC identifying unit 402 again. The LOC identifying unit 402 searches the LOC cache table 403 by using the destination address (destination ID) of a packet, received by the packet receiving unit 401, as a search key. That is, with respect to each entry in the LOC cache table 403, the LOC identifying unit 402 determines whether or not the destination address (destination ID) of a received packet matches (that is, is included in) the address range (destination ID range) stated by that entry. An entry that matches a destination ID in searching of the LOC cache table 403 is hereinafter referred to as a "matching destination ID range".

When no matching destination ID range is found as a result of the searching of the LOC cache table 403, the LOC identifying unit 402 determines that a LOC request message is to be transmitted to the destination ID that was used as the search key. The determination is made in order to obtain a transfer destination LOC. On the other hand, when only one matching destination ID range is found as a result of the searching, the LOC identifying unit 402 regards the entry corresponding to the matching destination ID range as a matching entry.

When multiple matching destination ID ranges are found as a result of the searching of the LOC cache table 403, the LOC identifying unit 402 regards, of the matching destination ID ranges, an entry having the largest mask length as a matching entry. This processing is based on the longest match principle for IP addresses. It is now assumed that two destination ID ranges "A.B.0.0/16" and "A.B.128.0/24" that match the destination ID "A.B.128.22" are found, as one example. In this case, the LOC identifying unit 402 regards an entry corresponding to "A.B.C.0/24" having the largest mask length as a matching entry.

Next, when any matching entry is found (when one or more matching address ranges are found) as a result of the searching of the LOC cache table 403, the LOC identifying unit 402 further searches the exclusion LOC cache table 404 by using the destination address (destination ID) of the received packet as a search key. That is, with respect to each entry in the exclusion LOC cache table 404, the LOC identifying unit 402 determines whether or not the destination address (destination ID) of the received packet matches (that is, is included in) the address range (destination ID range) stated by that entry. In the searching of the exclusion LOC cache table 404, an entry that matches a destination ID (that is, a matching entry) will be referred to as an "exclusion destination ID range".

When no exclusion destination ID range is found as a result of the searching of the exclusion LOC cache table 404, the LOC identifying unit 402 determines that the received packet is to be transferred to the transfer destination LOC in the matching entry found in the searching of the LOC cache table 403. This is because the absence of a matching entry in the exclusion LOC cache table 404 indicates that the transfer destination LOC may be determined based on the LOC cache table 403.

When one or more exclusion address ranges are found as a result of the searching of the exclusion LOC cache table 404, the LOC identifying unit 402 determines that a LOC request message corresponding to the destination ID used as the search key is to be transmitted. The absence of a matching entry in the exclusion LOC cache table 404 indicates that a transfer destination LOC is not be determined based on the LOC cache table 403. This is because, in this case, the transfer destination LOC of the received packet is to be obtained.

Upon determining the transfer destination LOC of the received packet, the LOC identifying unit 402 inputs the received packet to the encapsulating unit 405. As described above, when a matching entry is found in the LOC cache table 403 and no matching entry is found in the exclusion LOC cache table 404, the LOC identifying unit 402 determines that the received packet is to be transferred to the "transfer destination LOC" in the matching entry. In this case, the LOC identifying unit 402 inputs the received packet and the determined transfer destination LOC to the encapsulating unit 405.

On the other hand, when no matching entry is found in the LOC cache table 403 or when a matching entry is found in the LOC cache table 403 and a matching entry is also found in the exclusion LOC cache table 404, the LOC identifying unit 402 determines that a LOC request message for the received packet is to be transmitted. In this case, the LOC identifying unit 402 inputs, to the LOC-request generating unit 410, a signal that gives an instruction for transmitting the LOC request message. Subsequently, when the "transfer destination LOC" contained in a LOC response message that is a response to the LOC request message is input from the LOC-response processing unit 413 (described below), the LOC identifying unit 402 determines that the received packet is to be transferred to the "transfer destination LOC". The LOC identifying unit 402 inputs the received packet and the determined transfer destination LOC to the encapsulating unit 405.

A description will now be given of the encapsulating unit 405. The encapsulating unit 405 encapsulates the IP packet, received by the packet receiving unit 401, into an IP packet to generate an encapsulated packet (a LISP packet) for transfer. This processing is performed in the following manner. The IP packet received by the packet receiving unit 401 is a packet in which an IP header is added to its payload (data). The encapsulating unit 405 further adds another IP header to the received IP packet. The encapsulating unit 405 then sets the transfer destination LOC, determined by the LOC identifying unit 402, for a destination address in the added IP header. As a result of the processing, an encapsulated packet, which is a packet obtained by encapsulating an IP packet into an IP packet, is generated. Double IP headers are added to the payload (data) in the encapsulated packet. The inner IP header is one originally added to the received packet and has a destination IP address for which a destination ID indicating the final destination host 3 of the received packet is set. On the other hand, the outer IP header is the one added by the encapsulating unit 405 and has a destination IP address for which a destination LOC indicating, in the core network 1, the transfer destination of the received packet is set. Based on the outer IP header, the encapsulated packet is relayed in the core network 1 toward the egress edge node 4b (destination LOC). Based on the inner IP header, the encapsulated packet is relayed from the egress edge node 4b toward the destination host 3 (destination ID) in the access network 2. The encapsulating unit 405 inputs the encapsulated packet (LISP packet) to the relay-destination determination unit 406.

By using the destination address (destination LOC) in the outer IP header in the encapsulated packet as a search key, the relay-destination determination unit 406 searches the route table 407 to determine the relay destination (the next hop) of the encapsulated packet. The route table 407 is the so-called "routing table". For example, by using a routing protocol such as Border Gateway Protocol (BGP), the route-information exchanging and processing unit 408 exchanges route information with an adjacent node to create and update the route table 407. Since the relay-destination determination unit 406, the route table 407, and the route-information exchanging and processing unit 408 have functions that are equivalent to those of typical routers and layer 3 switches, a description thereof is not given hereinafter. The relay-destination determination unit 406 inputs the encapsulated packet and the determined relay destination to the packet transmitting unit 409.

The packet transmitting unit 409 transmits the encapsulated packet to the relay destination determined by the relay-destination determination unit 406. First, the packet transmitting unit 409 adds a MAC header, such as an Ethernet (registered trademark) header, to the encapsulated packet to generate a media access control (MAC) frame and sets the relay destination for a MAC address in the MAC header. Since this processing is also performed by typical routers, layer 3 switches, and so on, a detailed description of the processing is not given hereinafter. After setting the relay destination for the MAC address, the packet transmitting unit 409 transmits the generated MAC frame to the core network 1 (the data plane 11).

Next, a description will be given of the LOC-request generating unit 410. The LOC-request generating unit 410 generates a LOC request message that requests the transfer destination LOC for the received packet. FIG. 10A illustrates one example of the LOC request message. The LOC request message includes a "message type" and a "destination ID". The "message type" contains an identifier indicating that the corresponding message is a LOC request message. The "destination ID" contains a destination ID that requests the control plane 12 for a transfer destination LOC. The LOC-request generating unit 410 stores the destination ID (destination address) of the received packet into the "destination ID" in the generated LOC request message. As a result of the processing, the generated LOC request message serves as a message that requests the control plane 12 for the transfer destination LOC corresponding to the destination ID in the received packet. The LOC-request generating unit 410 inputs the generated LOC request message to the LOC-request transmitting unit 411.

The LOC-request transmitting unit 411 transmits the LOC request message, generated by the LOC-request generating unit 410, to the management server 6 (the ingress management server 6a). The ingress management server 6a is the management server 6 that manages the ingress edge node 4a, and may be pre-determined or may be determined for each operation by some method.

The LOC-response receiving unit 412 receives the LOC response message that is a response message for the LOC request message transmitted by the LOC-request transmitting unit 411. The LOC-response receiving unit 412 inputs the received LOC response message to the LOC-response processing unit 413.

Now, the LOC response message will be described with reference to FIG. 10B. FIG. 10B illustrates one example of a LOC response message. The LOC response message is a control message for reporting a transfer destination LOC, which corresponds to a destination ID, requested by a LOC request message. The LOC response message contains a "message type", "route information", and "exclusion route information". The "message type" contains an identifier indicating that the corresponding message is a LOC response message.

In the LOC response message illustrated in FIG. 10B, the "route information" indicates, for each access network, a transfer destination LOC requested by the LOC request message. The LOC response message contains one piece of route information. The route information contains a "destination ID range" and a "transfer destination LOC". In addition, the "destination ID range" is represented by a set of a "network address" and a "mask length". The "network address" contains the network address of the access network 2 that manages the destination ID requested by the LOC request message. The "mask length" contains the mask length of the access network 2 that manages the destination ID requested by the LOC request message. The "transfer destination LOC" contains the LOC (the address of the egress edge node 4b) of the access network 2 that manages the destination ID requested by the LOC request message.

In the LOC response message illustrated in FIG. 10B, the "exclusion route information" indicates, in the "destination ID range" stated by the "route information", a destination ID range (another access network 2) in which the received packet is not be transferred to the "transfer destination LOC". The exclusion route information may be or may not be contained in the LOC response message. Multiple pieces of exclusion route information may also be contained in the LOC response message. As illustrated in FIG. 10B, the exclusion route information corresponds to the "destination ID range" and is further represented by a set of a "network address" and a "mask length". The destination ID range, which is represented by a set of a "network address" and a "mask length", represents a destination ID range in which the received packet is not to be transferred to the "transfer destination LOC" in the route information.

Referring back to FIG. 8, the LOC-response processing unit 413 inputs the transfer destination LOC of the received packet to the LOC identifying unit 402 on the basis of the received LOC response message. The LOC-response processing unit 413 also updates the LOC cache table 403 and the exclusion LOC cache table 404 on the basis of the received LOC response message.

Processing of the LOC-response processing unit 413 will be described specifically. The LOC-response processing unit 413 inputs the "transfer destination LOC" in the "route information", contained in the LOC response message, to the LOC identifying unit 402 as the transfer destination of a received packet. In response to the "transfer destination LOC", the LOC identifying unit 402 determines that the received packet is to be transmitted to the "transfer destination LOC", as described above.

The LOC-response processing unit 413 also updates the LOC cache table 403 on the basis of the "route information" contained in the LOC response message. At this point, the LOC-response processing unit 413 adds the set of the "destination ID range" (the "network address" and the "mask length") and the "transfer destination LOC" in the route information, contained in the LOC response message, to the LOC cache table 403 as an entry without making changes to the set. In addition, the LOC-response processing unit 413 updates the exclusion LOC cache table 404 on the basis of the "exclusion route information" contained in the LOC response message. At this point, the LOC-response processing unit 413 adds the "destination ID range" (the "network address" and the "mask length") in the exclusion route information, contained in the LOC response message, as an entry in the exclusion LOC cache table 404 without making changes to the set. When an entry corresponding to the entry added to the LOC cache table 403 already exists in the exclusion LOC cache table 404, the LOC-response processing unit 413 deletes that entry from the exclusion LOC cache table 404.

Figure 11:
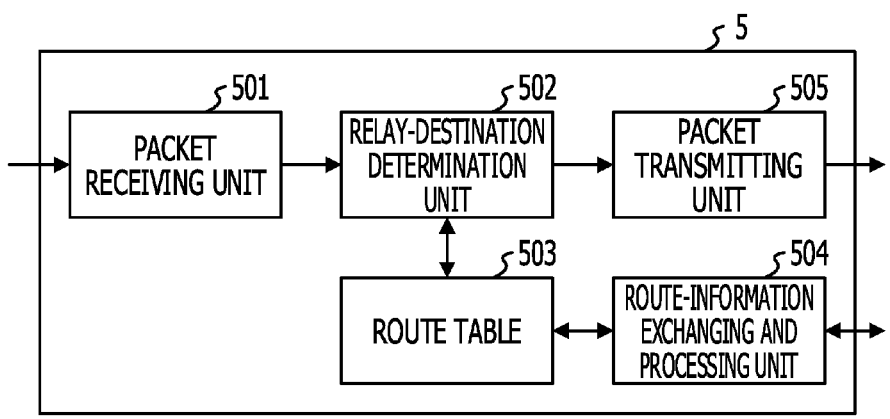
FIG. 11 illustrates one example of the functional configuration of a relay node in the communication system in first embodiment.

Next, the relay nodes 5 in the first embodiment will be described with reference to FIG. 11. FIG. 11 illustrates one example of the functional configuration of one relay node 5 in the first embodiment. The relay node 5 includes a packet receiving unit 501, a relay-destination determination unit 502, a route table 503, a route-information exchanging and processing unit 504, and a packet transmitting unit 505. The relay node 5 corresponds to a typical router apparatus or a layer 3 switch apparatus. Thus, the relay node 5 will be briefly described herein.

The packet receiving unit 501 receives an IP packet from the network and inputs the IP packet to the relay-destination determination unit 502. By using the destination address in the IP header in the received IP packet as a search key, the relay-destination determination unit 502 searches the route table 503 to determine the relay destination (the next hop) of the IP packet. When the received IP packet is an encapsulated packet (a LISP packet), the relay-destination determination unit 502 searches the route table 503 by using the destination address (destination LOC) in the outer IP header in the encapsulated packet as a search key to thereby determine the relay destination (the next hop) of the encapsulated packet. The route table 503 is the so-called "routing table". For example, by using a routing protocol such as the BGP, the route-information exchanging and processing unit 504 exchanges the route information with an adjacent node to create and update the route table 503. The packet transmitting unit 505 transmits the received IP packet to the determined relay destination.

Figure 12:
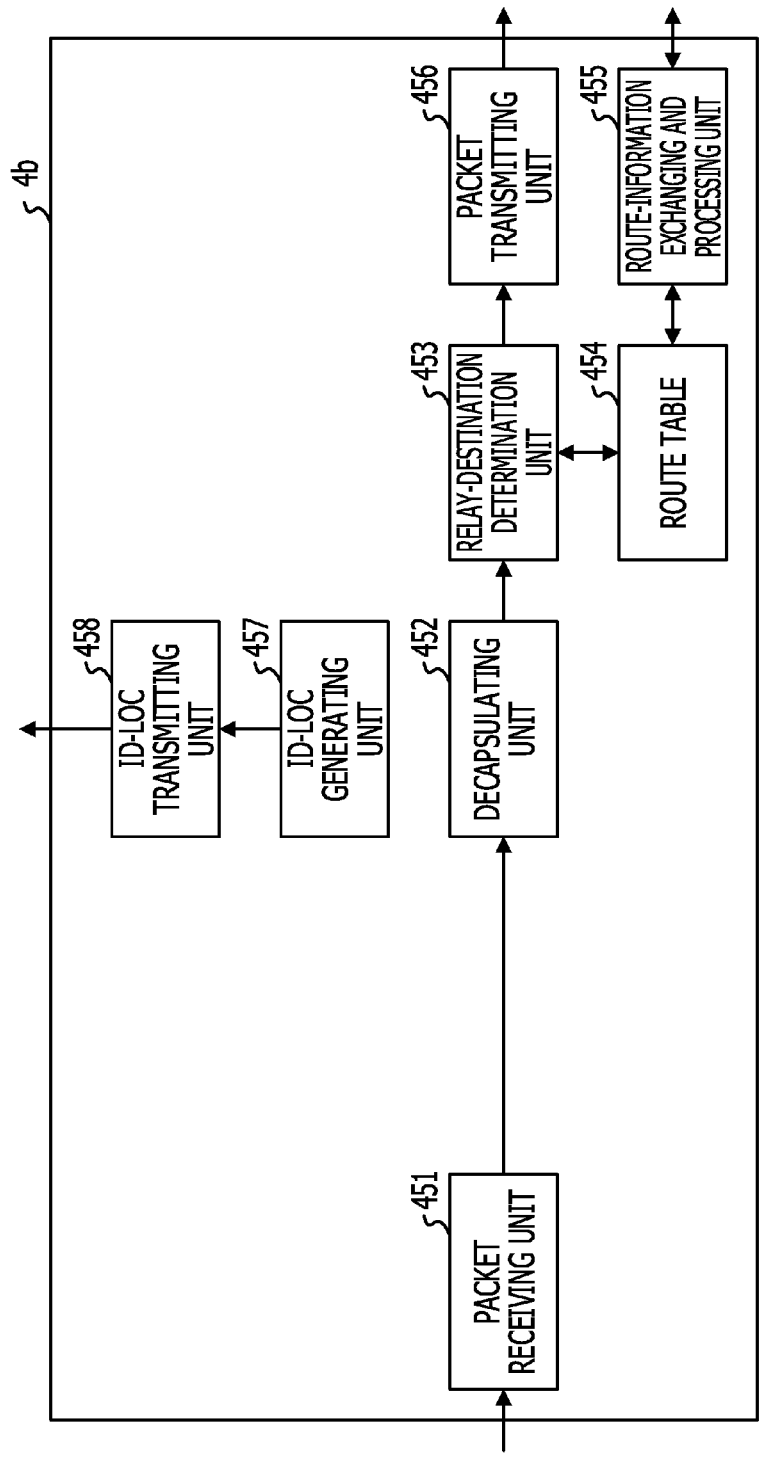
FIG. 12 illustrates one example of the functional configuration of an egress edge node in the communication system in the first embodiment.

Next, the egress edge node 4b in the first embodiment will be described with reference to FIG. 12. FIG. 12 illustrates one example of the functional configuration of the egress edge node 4b in the first embodiment. The egress edge node 4b includes, for example, a packet receiving unit 451, a decapsulating unit 452, a relay-destination determination unit 453, a route table 454, a route-information exchanging and processing unit 455, a packet transmitting unit 456, an ID-LOC generating unit 457, and an ID-LOC transmitting unit 458.

The packet receiving unit 451 receives an encapsulated packet (a LISP packet), transmitted by the ingress edge node 4a, through the core network 1 (the data plane 11) to which the egress edge node 4b couples. The packet receiving unit 451 inputs the received encapsulated packet to the decapsulating unit 452.

The decapsulating unit 452 decapsulates (that is, removes the packet) from the received encapsulated packet. The decapsulation is performed in the following manner. The received encapsulated packet has double IP headers added thereto, as described above. The decapsulating unit 452 performs decapsulation by removing the outer IP header from the received encapsulated packet. Thus, the inner IP header remains. As described above, the destination address of the inner IP header is a destination ID. The decapsulating unit 452 inputs the IP packet, obtained by the decapsulation, to the relay-destination determination unit 453.

The relay-destination determination unit 453 refers to the route table 454 to identify the relay destination (next hop) of the IP packet in the access network 2. The route table 454 is the so-called "routing table". For example, by using a routing protocol such as Open Shortest Path First (OSPF) protocol, the route-information exchanging and processing unit 455 exchanges the route information with an adjacent node to create and update the route table 454. The relay-destination determination unit 453 inputs the IP packet and the identified relay destination to the packet transmitting unit 456. On the basis of the IP packet and the identified relay destination, the packet transmitting unit 456 transmits the IP packet to the destination host 3 (destination ID) in the access network 2.

The ID-LOC generating unit 457 generates an ID-LOC registration message, for example, at a predetermined timing, such as at the startup time of the egress edge node 4b. The ID-LOC generating unit 457 may generate an ID-LOC registration message periodically or upon occurrence of some type of event.

FIG. 13 illustrates one example of the ID-LOC registration message. The ID-LOC registration message includes the elements of a "message type", a "destination ID range", and a "transfer destination LOC". The "Destination ID range" contains the elements of a "network address" and a "mask length". The "message type" is an identifier indicating that the corresponding message is an ID-LOC registration message. The "network address" and the "mask length" in the "destination ID range" correspond to the network address and the mask length, respectively, of the access network 2 to which the egress edge node 4b couples. The "transfer destination LOC" corresponds to the IP address (LOC) of the egress edge node 4b at the core network 1 side.

The ID-LOC transmitting unit 458 transmits the ID-LOC registration message, generated by the ID-LOC generating unit 457, to the egress management server 6b.

Figure 14:
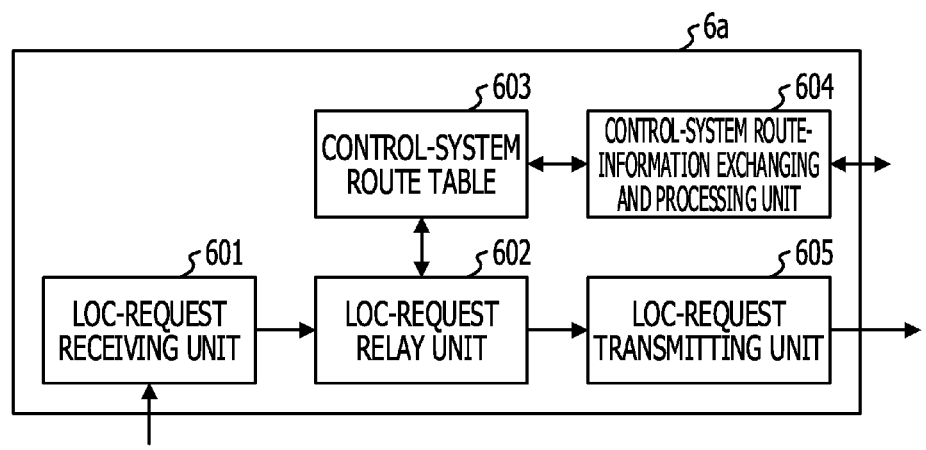
FIG. 14 illustrates one example of the functional configuration of an ingress management server in the communication system in the first embodiment.

The ingress management server 6a in the first embodiment will now be described with reference to FIGS. 14 and 15. FIG. 14 illustrates one example of the functional configuration of the ingress management server 6a in the first embodiment. The ingress management server 6a includes a LOC-request receiving unit 601, a LOC-request relay unit 602, a control-system route table 603, a control-system route-information exchanging and processing unit 604, and a LOC-request transmitting unit 605.

The LOC-request receiving unit 601 receives a LOC request message from the ingress edge node 4a. The LOC-request receiving unit 601 inputs the received LOC request message to the LOC-request relay unit 602.

The LOC-request relay unit 602 determines the relay destination of the LOC request message on the basis of the control-system route table 603. The LOC-request relay unit 602 adds information to the received LOC request message on the basis of the control-system route table 603, as appropriate. This processing is performed in the following manner.

The control-system route table 603 will now be described with reference to FIG. 15. The control-system route table 603 may be implemented by a typical routing table. Each entry in the control-system route table 603 is information in which a "network address, a "mask length", and a "relay destination address" are related with each other. The relation indicates that, when a LOC request message is to be transmitted to the address range defined by the set of the "network address" and the "mask length", the LOC request message is to be relayed and transmitted to an address indicated by the "relay destination address". The "network address" and the "mask length" correspond to, for example, the network address and the mask length, respectively, of the access network 2. The "relay destination address" corresponds to the address of an adjacent node that is the next hop of the ingress edge node 4a on the control plane 12. The adjacent node may be the control-system relay node 7 or may be another management server 6 (for example, the egress management server 6b).

The control-system route-information exchanging and processing unit 604 creates and controls the control-system route table 603. By using a routing protocol such as the BGP, the control-system route-information exchanging and processing unit 604 exchanges control-system route information with an adjacent node to create and update the control-system route table 603.

A description will now be given with reference back to the LOC-request relay unit 602 in FIG. 14. The LOC-request relay unit 602 searches the control-system route table 603 twice by using the "destination ID", contained in the received LOC request message, as a search key. This searching is performed in the following manner.

First, the LOC-request relay unit 602 performs first searching of the control-system route table 603 by using the "destination ID", contained in the received LOC request message, as a search key. That is, with respect to each entry in the control-system route table 603, the LOC-request relay unit 602 determines whether or not the "destination ID" matches (that is, is included in) the address range defined by the "network address" and the "mask length" in the entry. When only one entry that matches the "destination ID" is found in the control-system route table 603 as a result of the first searching thereof, the LOC-request relay unit 602 regards the entry as a matching entry.

When multiple entries that match the "destination ID" are found in the control-system route table 603 as a result of the first searching thereof, the LOC-request relay unit 602 regards, of the multiple entries, one entry having the largest mask length as a matching entry. This processing is based on the longest match principle for IP addresses.

The LOC-request relay unit 602 determines that the "relay destination address" in the matching entry in the first searching of the control-system route table 603 is the relay destination of the LOC request message. This determination does not change even when the number of entries that match the "destination ID" is singular or plural.

Next, the LOC-request relay unit 602 performs second searching (re-searching) of the control-system route table 603 on the basis of the "destination ID" contained in the received LOC request message. In the re-searching, the LOC-request relay unit 602 does not use the "mask length" of each entry in the control-system route table 603. Instead, in the re-searching, the LOC-request relay unit 602 uses the "mask length" in a matching entry in the first searching of the control-system route table 603. That is, with respect to each entry in the control-system route table 603, the LOC-request relay unit 602 determines whether or not the "destination ID" matches (that is, is included in) the address range defined by the "network address" in the entry and the "mask length" in the matching entry in the first searching of the control-system route table 603. The LOC-request relay unit 602 regards, as a matching entry in the re-searching, an entry that matches the "destination ID" in the determination.

For example, it is assumed that the mask length of a matching entry in the first searching of the control-system route table 603 is "16". It is further assumed that an entry E having a network address of "A.B.128.0" and a mask length of "24" exists in the control-system route table 603. In this case, during re-searching of the control-system route table 603, with respect to the entry E, the LOC-request relay unit 602 determines whether or not the "destination ID" is included in the address range defined by the network address "A.B.128.0" and the mask length "16". For example, when the destination ID in the LOC request message is "A.B.10.11", this destination ID does not match "A.B.128.0/24" but matches "A.B.128.0/16" (which is substantially the same as "A.B.0.0/16"). Thus, although this destination ID does not match the entry E in the first searching of the control-system route table 603, it matches the entry E in the re-searching.

Next, when a matching entry is found in the re-searching of the control-system route table 603, the LOC-request relay unit 602 adds exclusion route information to the received LOC request message. FIG. 16 illustrates an example of the LOC request message to which the exclusion route information is added. The LOC-request relay unit 602 adds the set of the "network address" and the "mask length" in the matching entry in the re-searching to the LOC request message as the exclusion route information. When multiple matching entries are found in the re-searching, the LOC-request relay unit 602 adds the exclusion route information for all of the matching entries to the LOC request message. When no matching entry is found in the re-searching of the control-system route table 603, the LOC-request relay unit 602 may or may not add the exclusion route information to the LOC request message.

When a matching entry is found in the re-searching of the control-system route table 603, the LOC-request relay unit 602 inputs, to the LOC-request transmitting unit 605, the LOC request message to which the exclusion route information is added. On the other hand, when no matching entry is found in the re-searching of the control-system route table 603, the LOC-request relay unit 602 inputs the received LOC request message to the LOC-request transmitting unit 605. Lastly, the LOC-request transmitting unit 605 relays and transmits the LOC request message, input from the LOC-request relay unit 602, to the relay destination address determined by the LOC-request relay unit 602.

Figure 17:
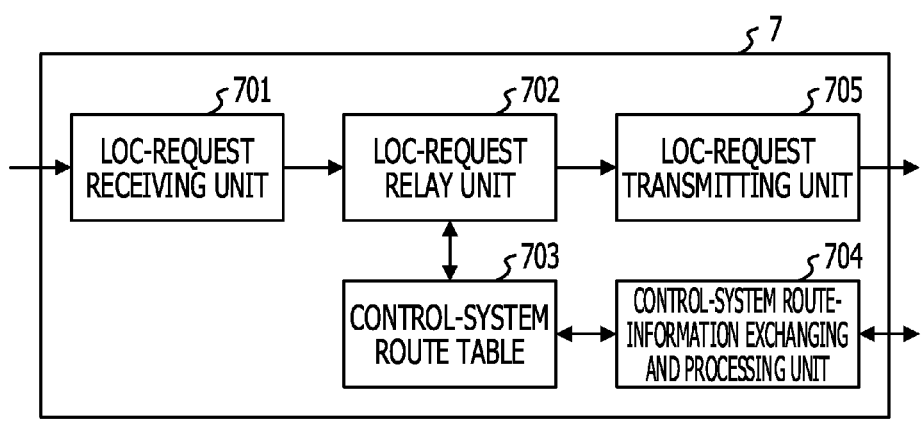
FIG. 17 illustrates the functional configuration of a control-system relay node in the communication system in the first embodiment.

Next, one control-system relay node 7 in the first embodiment will be described with reference to FIG. 17. FIG. 17 illustrates one example of the functional configuration of the control-information relay node 7 in the first embodiment. The control-information relay node 7 includes a LOC-request receiving unit 701, a LOC-request relay unit 702, a control-system route table 703, a control-system route-information exchanging and processing unit 704, and a LOC-request transmitting unit 705. The control-information relay node 7 has functions that are substantially the same as or similar to the corresponding functions of the ingress management server 6a. Thus, a description of the functions is not given hereinafter.

Figure 18:
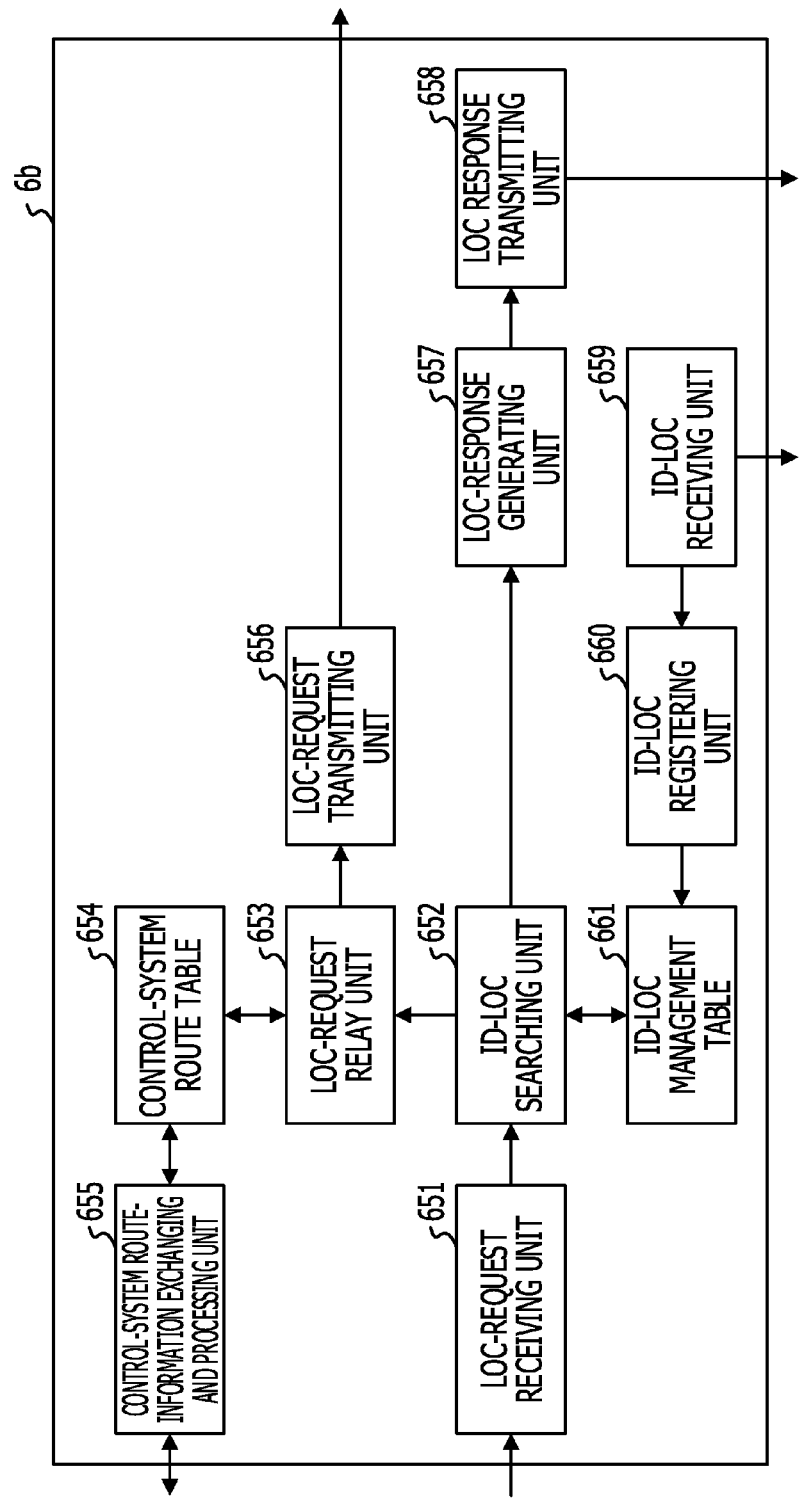
FIG. 18 illustrates one example of the functional configuration of an egress management server in the communication system in the first embodiment.

Next, the egress management server 6b in the first embodiment will be described with reference to FIG. 18. FIG. 18 illustrates one example of the functional configuration of the egress management server 6b in the first embodiment. The egress management server 6b includes a LOC-request receiving unit 651, an ID-LOC searching unit 652, a LOC-request relay unit 653, a control-system route table 654, a control-system route-information exchanging and processing unit 655, a LOC-request transmitting unit 656, a LOC-response generating unit 657, a LOC response transmitting unit 658, an ID-LOC receiving unit 659, an ID-LOC registering unit 660, and an ID-LOC management table 661.

The LOC-request receiving unit 651 receives a LOC request message from an adjacent node. The LOC-request receiving unit 651 inputs the received LOC request message to the ID-LOC searching unit 652. The ID-LOC searching unit 652 searches the ID-LOC management table 661 by using the "destination ID" in the received LOC request message as a search key.

Now, a description will be given of the ID-LOC management table 661. As illustrated in FIGS. 1 to 5 and FIGS. 19, 20 (described below), and so on, the ID-LOC management table 661 contains the elements of a "destination ID range" and a "transfer destination LOC". In addition, the "destination ID range" contains the elements of a "network address" and a "mask length". The "network address" and the "mask length" in the "destination ID range" correspond to the network address and the mask length, respectively, of the access network 2 to which the egress edge node 4b couples. The "transfer destination LOC" corresponds to the IP address (LOC) of the egress edge node 4b at the core network 1 side. The entry registration to the ID-LOC management table 661 is performed by the ID-LOC registering unit 660. More specifically, the ID-LOC registering unit 660 registers an entry into the ID-LOC management table 661 on the basis of the ID-LOC registration message received by the ID-LOC receiving unit 659.

A description will be given of the ID-LOC searching unit 652 again. When the ID-LOC searching unit 652 does not find any matching entry as a result of searching of the ID-LOC management table 661 by using the "destination ID" in the received LOC request message as a search key, the ID-LOC searching unit 652 recognizes that the "destination ID" is not included in the access network 2 to which the ID-LOC searching unit 652 belongs. In this case, the ID-LOC searching unit 652 inputs the received LOC request message to the LOC-request relay unit 653. This inputting is performed in order to relay and transmit the LOC request message to an adjacent apparatus.

The LOC-request relay unit 653, the control-system route table 654, and the LOC-request transmitting unit 656 have functions that are substantially the same as the corresponding functions of the ingress management server 6a. Thus, a description of the functions is not given hereinafter. For example, by using a routing protocol such as the BGP, the control-system route-information exchanging and processing unit 655 exchanges control-system route information with an adjacent node to create and update the control-system route table 654. In this case, the control-system route-information exchanging and processing unit 655 generates the control-system route information on the basis of the contents of the ID-LOC management table 661. More specifically, the control-system route-information exchanging and processing unit 655 generates the control-system route information so that a communication for the address range, defined by the "network address" and the "mask length", of the access network 2 below the corresponding egress management server 6b is relayed to the "destination LOC" in the core network 1 and then exchanges the control-system route information.

A description will be given of the ID-LOC searching unit 652 again. When the ID-LOC searching unit 652 finds a matching entry as a result of the searching of the ID-LOC management table 661 by using the "destination ID" in the received LOC request message as a search key, the ID-LOC searching unit 652 recognizes that the "destination ID" is included in the access network 2 to which the egress management server 6b couples. In this case, the ID-LOC searching unit 652 inputs the received LOC request message and the matching entry to the LOC-response generating unit 657.

On the basis of the LOC request message and the matching entry input from the ID-LOC searching unit 652, the LOC-response generating unit 657 generates the LOC response message illustrated in FIG. 10B. The LOC-response generating unit 657 stores the "network address", the "mask length", and the "transfer destination LOC" in the matching entry, found by the ID-LOC searching unit 652, into the "network address", the "mask length", and the "transfer destination LOC" in the "route information" in the LOC response message. Thus, the "network address" and the "mask length" in the LOC response message correspond to the network address and the mask length of the access network 2 to which the egress edge node 4b couples and the "transfer destination LOC" corresponds to the IP address (LOC) of the egress edge node 4b at the core network 1 side.

The LOC-response generating unit 657 also stores the exclusion route information, contained in the received LOC request message, into the "exclusion route information" in the LOC response message. When no exclusion route information is contained in the received LOC request message, this means that no exclusion route information is contained in the LOC response message.

The LOC-response generating unit 657 inputs the generated LOC response message to the LOC response transmitting unit 658. The LOC response transmitting unit 658 transmits the input LOC response message toward the ingress edge node 4a. The LOC response transmitting unit 658 transmits the LOC response message toward the ingress edge node 4a via the egress edge node 4b corresponding to the egress management server 6b and also through the data plane 11. The LOC response transmitting unit 658 may also transmit the LOC response message to the ingress edge node 4a through the control plane 12.

The fact that the above-described problem of the packet non-arrival is solved by the above-described configuration in the first embodiment will be described below with reference to FIGS. 19 and 20.

Figure 19:
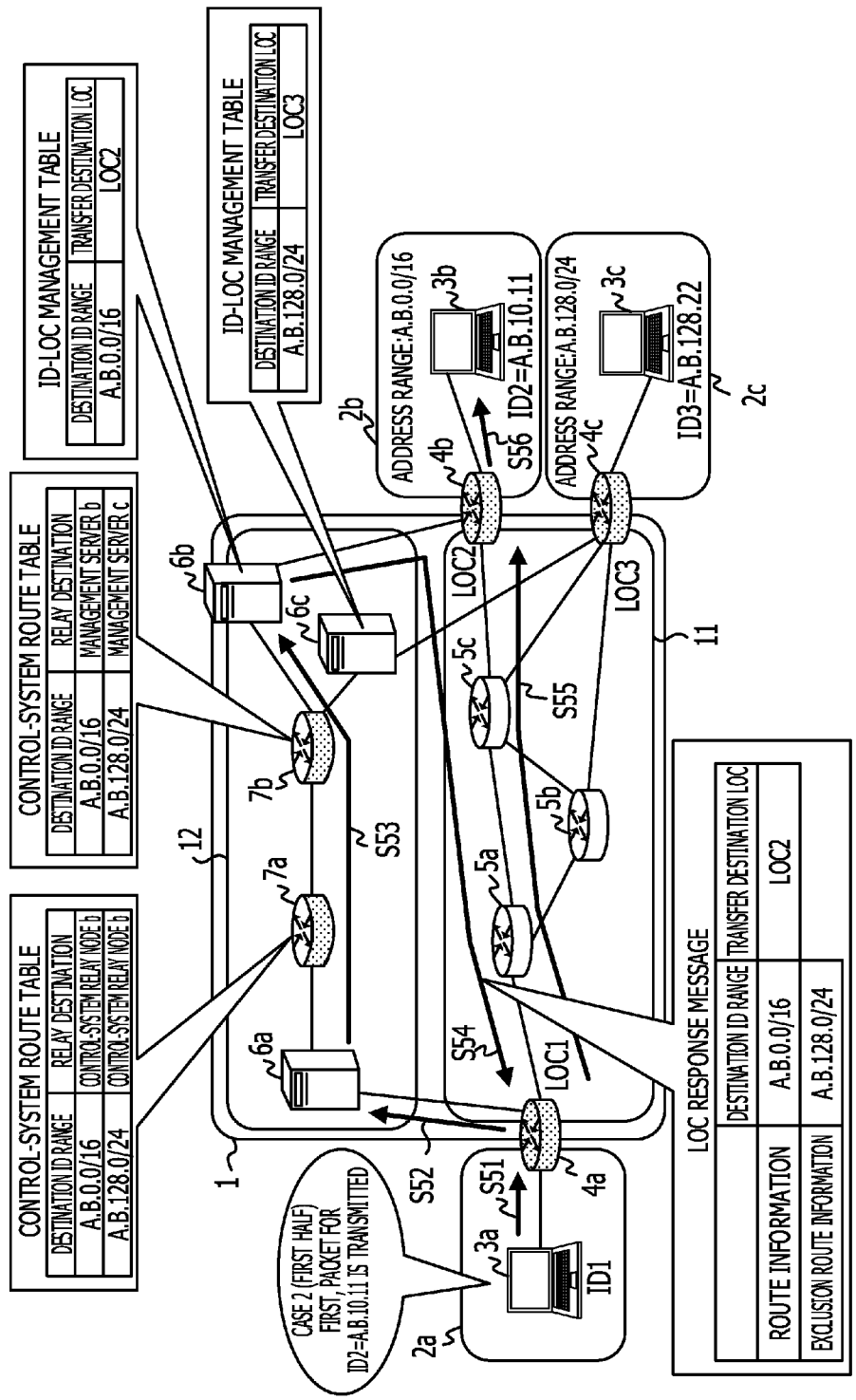
FIG. 19 is a diagram (a first half) illustrating advantages of the communication system in the first embodiment.
Figure 20:
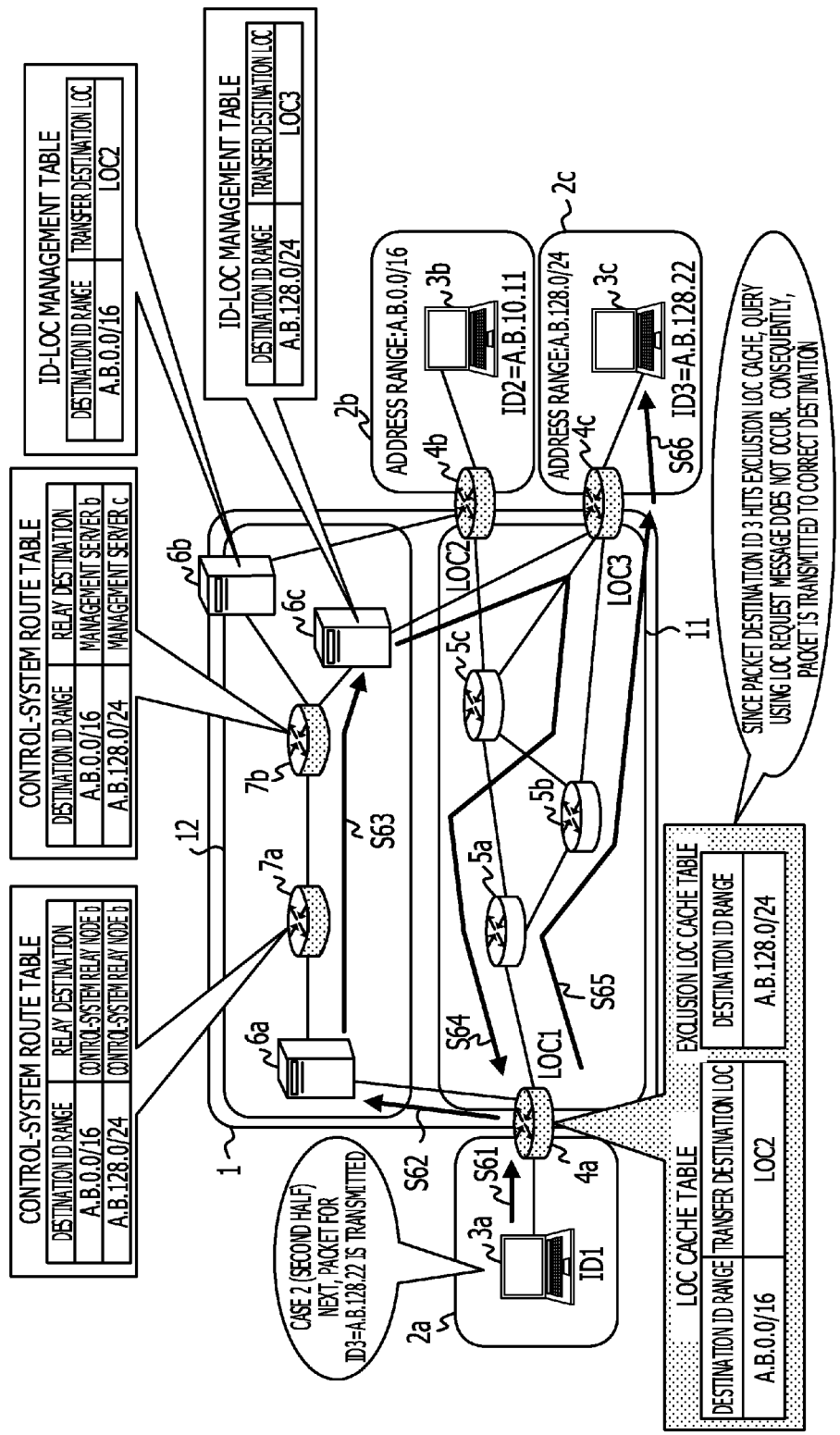
FIG. 20 is a diagram (a second half) illustrating the advantages of the communication system in the first embodiment.

FIGS. 19 and 20 illustrate a case in which case 2 described above occurs in the network in the first embodiment. In the LISP network in the related art, when an entry in the LOC cache table 403 is simply stored for each access network, the problem of the packet non-arrival occurs in case 2, as described above with reference to FIGS. 4 and 5. Now, the fact that the problem of the packet non-arrival does not occur in the network in the first embodiment even when case 2 occurs will be described with reference to FIGS. 19 and 20. As described above, case 2 refers to a case in which a communication first occurs from the host 3a (ID1) to the host 3b (ID2=A.B.10.11) and then a communication occurs from the host 3a (ID1) to the host 3c (ID3=A.B.128.22).

FIG. 19 illustrates a state in which, in case 2, a communication first occurs from the host 3a (ID1) to the host 3b (ID2=A.B.10.11). Since S51 and S52 in FIG. 19 are substantially the same as S31 and S32 in FIG. 4, a description thereof is not given hereinafter.

Subsequent to S52, a LOC request message is transmitted from the ingress management server 6a, is relayed through the control plane 12, and then arrives at the egress management server 6b (S53). In this case, each of the ingress management server 6a, the control-system relay node 7a, the control-system relay node 7b, and the egress management server 6b in FIG. 19 performs the relay processing of the LOC request message described above. A flow of the relay processing of the LOC request message has been described in detail in the LOC-request relay unit 602 of the ingress management server 6a. Now, the relay processing of the LOC request message at the control-system relay node 7b will be described specifically.

First, the control-system relay node 7b performs first searching of the control-system route table by using the ID2 (=A.B.10.11) that is the "destination ID" in the LOC request message as a search key. In this case, the ID2 (=A.B.10.11) matches only "A.B.0.0/16" and does not match "A.B.128.0/24". Thus, a matching entry in the first searching of the control-system route table is "A.B.0.0/16".

Next, the control-system relay node 7b performs second searching (re-searching) of the control-system route table by using the ID2 as a search key. In the re-searching, it is to be noted that the mask length in the matching entry in the first searching is used without use of the mask length in each entry in the control-system route table, as described above. In the example in FIG. 19, the mask length in the matching entry in the first searching is "16". In this case, the ID2 (=A.B.10.11) does not match "A.B.128.0/24" itself, but matches "A.B.128.0/16" since the mask length in the entry is replaced with "16" (the mask length in the matching entry in the first searching). Thus, in the second searching, "A.B.128.0/24" is a matching entry. On the basis of the matching entry in the second searching, the control-system relay node 7b adds exclusion route information "A.B.128.0/24" to the received LOC request message and relays and transmits the resulting LOC request message to the egress management server 6b that is the "relay destination" in the matching entry in the first searching.

In FIG. 19, in response to the LOC request message, the egress management server 6b transmits the LOC response message to the ingress edge node 4a (S54). At this point, the egress management server 6b stores the exclusion route information "A.B.128.0/24", contained in the received LOC request message, into the LOC response message and transmits the resulting LOC response message. Upon receiving the LOC response message, the ingress edge node 4a updates the LOC cache table 403 on the basis of the LOC response message, as in the case in FIG. 4. As a result, the entry "A.B.0.0/16, LOC2" or "A.B.10.11/16, LOC2" is added to the LOC cache table 403. In this case, the ingress edge node 4a further updates the exclusion LOC cache table 404 on the basis of the LOC response message. As a result, the entry "A.B.128.0/24" is added to the exclusion LOC cache table 404. Since S55 and S56 in FIG. 19 are substantially the same as S35 and S36 in FIG. 4, a description thereof is not given hereinafter.

FIG. 20 illustrates a state in which, in case 2, a next communication occurs from the host 3a (ID1) to the host 3b (ID3=A.B.128.22). Since S61 in FIG. 20 is substantially the same as S41 in FIG. 5, a description thereof is not given hereinafter.

Upon receiving a packet from the host 3a in the access network 2a, the ingress edge node 4a searches the LOC cache table 403 by using the destination address (ID3) of the packet as a search key. As a result of the searching of the LOC cache table 403 by using the ID3 (=A.B.128.22) as a search key, the ingress edge node 4a retrieves the matching entry "A.B.0.0/16, LOC2" or "A.B.10.11/16, LOC2". Next, the ingress edge node 4a searches the exclusion LOC cache table 404 by using the ID3 as a search key, as described in connection with FIGS. 8 and 9B. In this case, as a result of the searching of the exclusion LOC cache table 404 by using the ID3 (=A.B.128.22) as a search key, the ingress edge node 4a retrieves the matching entry "A.B.128.0/24".

Since the matching entry is found in the exclusion LOC cache table 404, the ingress edge node 4a neither encapsulates nor transmits the received packet for the ID3 based on the matching entry in the LOC cache table 403. As described above in connection with FIGS. 8 and 9B, when a matching entry is found in the exclusion LOC cache table 404, the ingress edge node 4a transmits a LOC request message for querying about a LOC corresponding to the ID3, which is a search key, to the ingress management server 6a (S62). There-after, the LOC request message is relayed from the ingress management server 6 through the control plane 12 and arrives at the egress management server 6c (S63). The egress management server 6c generates a LOC response message "A.B.128.0/24, LOC3" for the received LOC request message and transmits the LOC response message to the ingress edge node 4a (S64). On the basis of the received LOC response message, the ingress edge node 4a encapsulates the received packet and transmits the encapsulated packet to the LOC3 (S65). Lastly, the egress edge node 4c (ID3) transfers a packet, obtained by decapsulating the received encapsulated packet, to the destination address (ID3) of the packet (S66). Thus, in FIG. 20, the packet for the ID3 arrives at the host 3c (ID3), unlike the case in FIG. 5.

Thus, according to the first embodiment, as described above with reference to FIGS. 19 and 20, in case 2 (a case in which a communication first occurs from the host 3a to the host 3b and then a communication occurs from the host 3a to the host 3c), both of a packet for the host 3b (ID2) and a packet for the host 3c (ID3) which are transmitted from the host 3a (ID1) are also properly received. That is, according to the first embodiment, the packet non-arrival does not occur even in case 2.

As described above, according to the first embodiment, an entry in the LOC cache table 403 can be stored for each access network without occurrence of the packet non-arrival. More specifically, in the related art, since an entry is stored for each access network, an entry that is not supposed to be retrieved is retrieved in searching of the LOC cache table 403 in the ingress edge node 4a (false retrieval). In contrast, the ingress edge node 4a in this embodiment holds, in the exclusion LOC cache table 404, the exclusion route information regarding entries that are not supposed to be retrieved. Even when false retrieval occurs in the LOC cache table 403 in the ingress edge node 4a, the destination ID can be processed as not having matched any entry in the LOC cache table 403 in subsequent searching of the exclusion LOC cache table 404. Thus, with respect to the matching entry falsely retrieved from the LOC cache table 403, the ingress edge node 4a can transmit a LOC request message without performing the encapsulated-packet transmission based on the matching entry. As a result, the ingress edge node 4a transmits the encapsulated packet (LISP packet) to the correct transfer destination (LOC) in the core network 1 on the basis of the LOC response message. Eventually, the packet is transmitted to the correct destination (ID).

Thus, according to the first embodiment, an entry in the LOC cache table 403 can be stored for each access network without occurrence of the packet non-arrival. Thus, it is possible to significantly reduce the size of the LOC cache table 403 while maintaining the functions of the LISP network. The first embodiment, therefore, provides an advantage in that the number of entries in the LOC cache table can be reduced in a practical communication system employing the LISP.

[c] Second Embodiment

A second embodiment is aimed to achieve the same or similar object of the first embodiment by adding the mask length of an exclusion route to the LOC request message, instead of adding the exclusion route information to the LOC request message as in the first embodiment.

Since many points in the second embodiment are the same as those in the first embodiment, different points from the first embodiment will be mainly described blow.

A description will be given of an ingress edge node 4a in the second embodiment. The ingress edge node 4a in the second embodiment does not have some of the functions of the ingress edge node 4a in the first embodiment and corresponds to the ingress edge node 4a in the LISP system in the related art.

More specifically, the ingress edge node 4a in the second embodiment does not have an exclusion LOC cache table 404, unlike the ingress edge node 4a in the first embodiment. Thus, a LOC identifying unit 402 in the ingress edge node 4a in the second embodiment does not search an exclusion LOC cache table 404 after searching a LOC cache table 403. When a matching entry is found in the searching of the LOC cache table 403, the LOC identifying unit 402 in the ingress edge node 4a in the second embodiment transmits an encapsulated packet (a LISP packet) on the basis of the transfer destination LOC in the matching entry. In this case, the LOC identifying unit 402 does not transmit a LOC request message. On the other hand, when no matching entry is found in the searching of the LOC cache table 403, the LOC identifying unit 402 in the ingress edge node 4a in the second embodiment transmits a LOC request message. On the basis of the transfer destination LOC in a received LOC response message, the LOC identifying unit 402 transmits an encapsulated packet (a LISP packet).

A description will be given of an ingress management server 6a in the second embodiment. Compared with the ingress management server 6a in the first embodiment, the ingress management server 6a in the second embodiment is different in part of the processing of a LOC-request relay unit 602.

More specifically, when a matching entry is found in the second searching (re-searching) of the control-system route table, the LOC-request relay unit 602 in the ingress management server 6a in the first embodiment adds the exclusion route information to the LOC request message on the basis of the matching entry, as described above. The exclusion route information is a set of the network address and the mask length in the matching entry. In contrast, the ingress management server 6a in the LOC-request relay unit 602 in the second embodiment adds only the mask length in the matching entry as the exclusion route information to be added to the LOC request message.

When a matching entry is found in the re-searching of the control-system route table, the LOC-request relay unit 602 in the first embodiment newly adds exclusion route information based on the matching entry to the LOC request message, as described above. On the other hand, the LOC-request relay unit 602 in the second embodiment stores the exclusion route information (the mask length) in the LOC request message in the following manner. When no matching entry is found in the re-searching of the control-system route table and the received LOC request message contains no exclusion route information, the LOC-request relay unit 602 in the second embodiment stores the "mask length" in the matching entry in the first searching into the LOC request message. When a matching entry is found in the re-searching of the control-system route table and the received LOC request message contains no exclusion route information, the LOC-request relay unit 602 in the second embodiment stores the "mask length" in the matching entry in the re-searching into the LOC request message.

On the other hand, when no matching entry is found in the re-searching of the control-system route table and the received LOC request message already contains exclusion route information, the LOC-request relay unit 602 in the second embodiment compares the "mask length" in the exclusion route information with the "mask length" in the matching entry in the first searching. When the "mask length" in the matching entry in the first searching is larger, the LOC-request relay unit 602 in the second embodiment substitutes the "mask length" in the matching entry for the "mask length" in the exclusion route information already contained in the LOC request message. When a matching entry is found in the re-searching of the control-system route table and the received LOC request message already contains exclusion route information, the LOC-request relay unit 602 in the second embodiment compares the "mask length" in the exclusion route information already contained in the LOC request message with the "mask length" in the matching entry in the second searching. When the "mask length" in the matching entry in the re-searching is larger, the LOC-request relay unit 602 in the second embodiment substitutes the "mask length" for the "mask length" in the exclusion route information already contained in the LOC request message.

Compared with the control-system relay node 7 in the first embodiment, a control-system relay node 7 in the second embodiment is different in part of the processing of a LOC-request relay unit 702. Since the processing of the LOC-request relay unit 702 in the control-system relay node 7 in the second embodiment is substantially the same as the processing of the LOC-request relay unit 602 in the ingress management server 6a in the second embodiment, a description thereof is not given hereinafter.

A description will be given of an egress management server 6b in the second embodiment. Compared with the egress management server 6b in the first embodiment, the egress management server 6b in the second embodiment is different in part of the processing of a LOC-request relay unit 653 and a LOC-response generating unit 657. Since the processing of the LOC-request relay unit 653 in the egress management server 6b in the second embodiment is substantially the same as the processing of the LOC-request relay unit 602 in the ingress management server 6a in the second embodiment, a description thereof is not given hereinafter.

A description will be given of the LOC-response generating unit 657 in the egress management server 6b in the second embodiment. As described above, the LOC-response generating unit 657 in the egress management server 6b in the first embodiment stores the exclusion route information, contained in the LOC request message, into the LOC response message to be generated. In contrast, the LOC-response generating unit 657 in the egress management server 6b in the second embodiment does not store the exclusion route information into the LOC response message to be generated. Instead, the LOC-response generating unit 657 in the egress management server 6b in the second embodiment changes the "mask length" in the route information to be contained in the LOC response message to be generated, by referring to the "mask length" in the matching entry in the ID-LOC management table 661, as appropriate.

More specifically, when the "mask length" in the matching entry in the ID-LOC management table 661 is larger than the "mask length" in the exclusion route information contained in the LOC request message, the LOC-response generating unit 657 uses the "mask length" in the matching entry in the ID-LOC management table 661 as the "mask length" in the route information to be contained in the LOC response message. On the other hand, when the "mask length" in the matching entry in the ID-LOC management table 661 is smaller than the "mask length" in the exclusion route information contained in the LOC request message, the LOC-response generating unit 657 uses the "mask length" in the exclusion route information, contained in the LOC request message, as the "mask length" in the route information to be contained in the LOC response message. That is, the LOC-response generating unit 657 uses a larger one of the "mask length" in the matching entry in the ID-LOC management table 661 and the "mask length" in the exclusion route information, already contained in the LOC request message, as the "mask length" in the LOC response message.

The fact that the above-described problem of the packet non-arrival is overcome by the above-described configuration in the second embodiment will be described below with reference to FIGS. 21 and 22.

Figure 21:
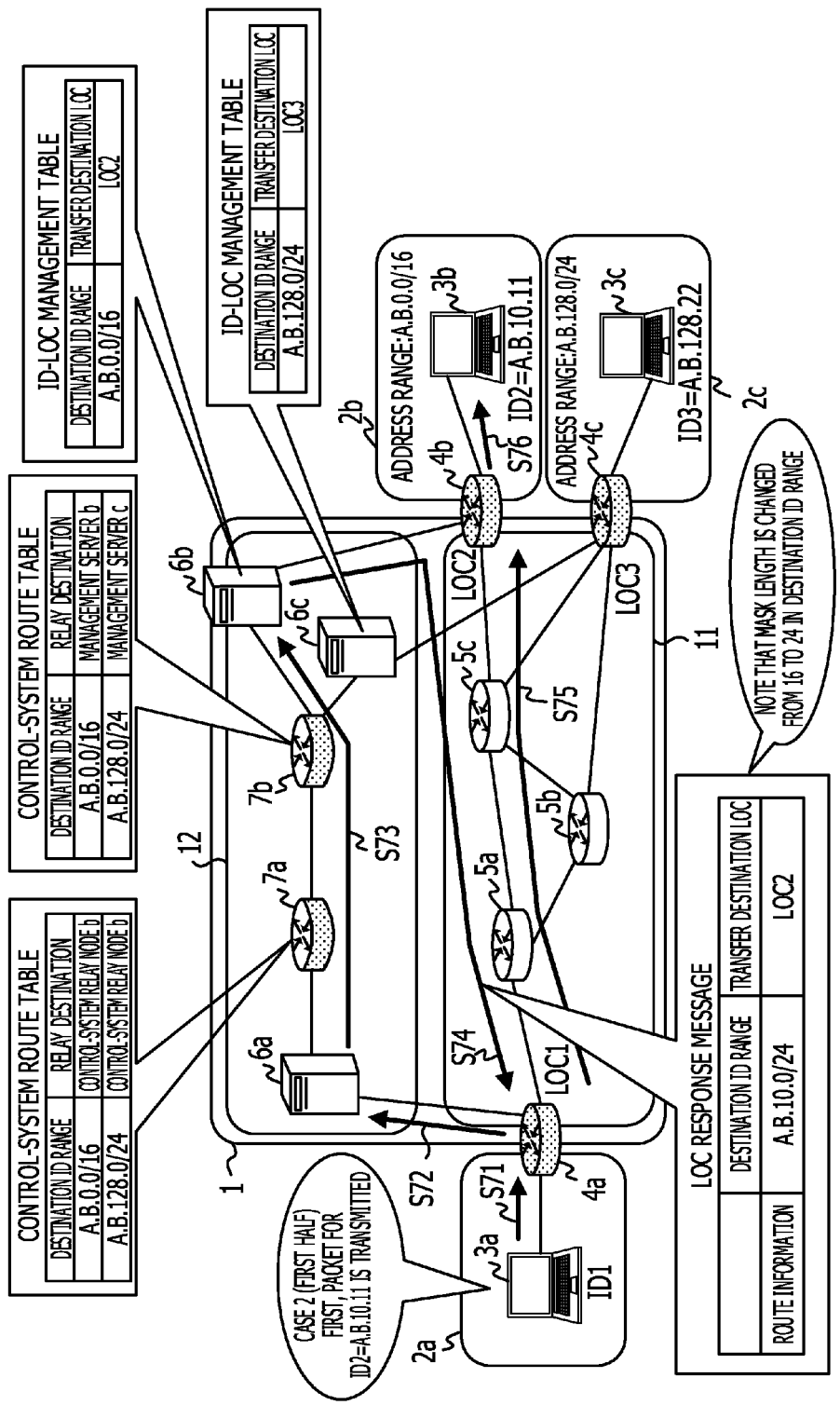
FIG. 21 is a diagram (a first half) illustrating advantages of a communication system in a second embodiment.
Figure 22:
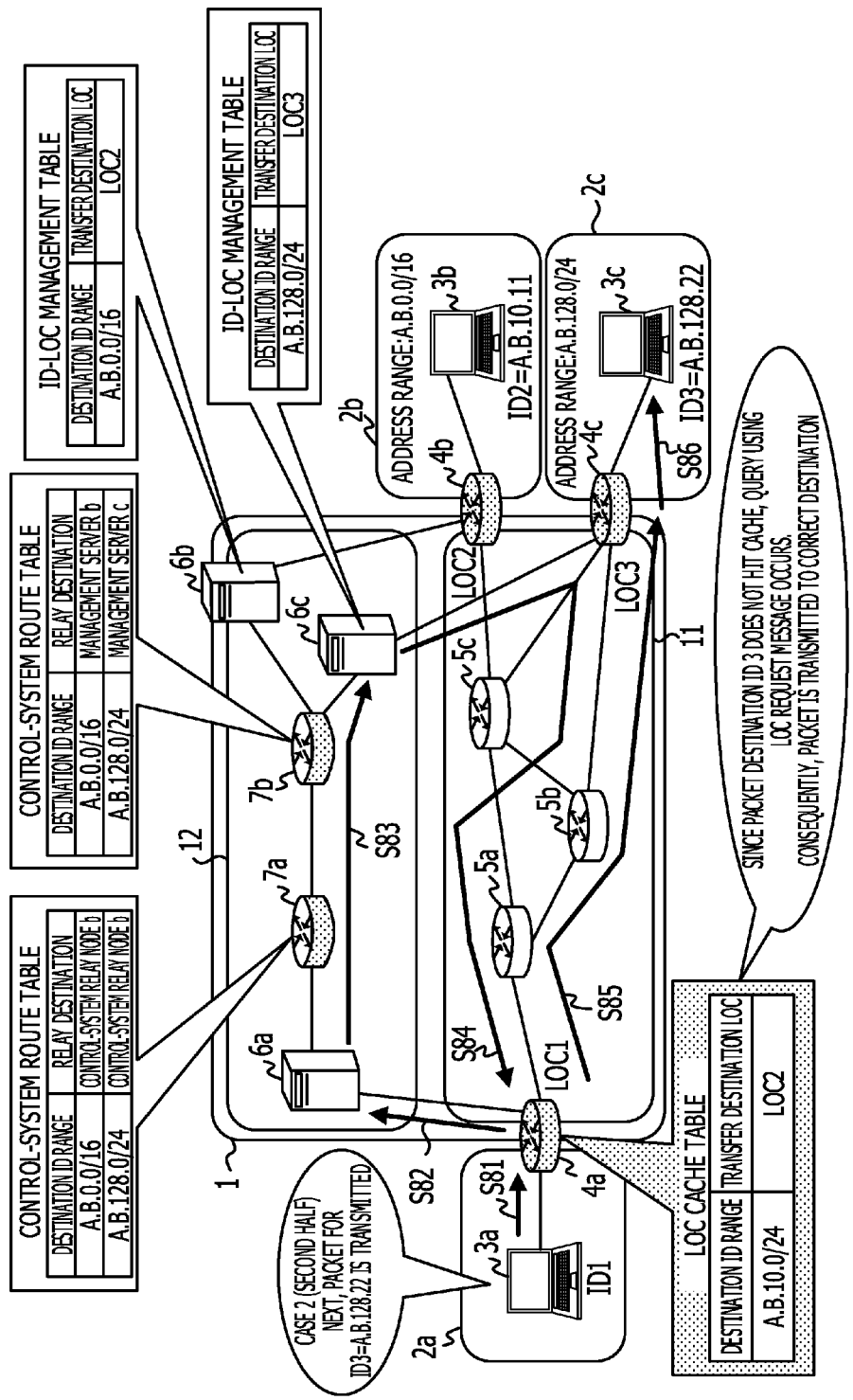
FIG. 22 is a diagram (a second half) illustrating the advantages of the communication system in the second embodiment.

FIGS. 21 and 22 illustrate a case in which case 2 occurs in the network in the second embodiment. As described above, case 2 refers to a case in which a communication first occurs from the host 3a (ID1) to the host 3b (ID2=A.B.10.11) and then a communication occurs from the host 3a (ID1) to the host 3c (ID3=A.B.128.22).

FIG. 21 illustrates a state in which, in case 2, a communication first occurs from the host 3a (ID1) to the host 3b (ID2=A.B.10.11). Since S71 and S72 in FIG. 21 are substantially the same as S51 and S52 in FIG. 19, a description thereof is not given hereinafter.

Subsequent to S72, a LOC request message is transmitted from the ingress management server 6a, is relayed through the control plane 12, and then arrives at the egress management server 6b (S73). The relay processing of the LOC request message at the control-system relay node 7b in S73 will be described specifically.

First, the control-system relay node 7b performs first searching of the control-system route table by using the ID2 (=A.B.10.11), which is the "destination ID" in the LOC request message, as a search key. A matching entry in the first searching of the control-system route table is "A.B.0.0/16". Next, the control-system relay node 7b performs second searching (re-searching) of the control-system route table by using the ID2 as a search key. It is to be noted that, in the re-searching, the mask length in the matching entry in the first searching is used without use of the mask length in each entry in the control-system route table, as described above. In the re-searching, a matching entry is "A.B.128.0/24".

Since a matching entry is found in the re-searching of the control-system route table, the control-system relay node 7b adds exclusion route information containing "24", which is the "mask length" in the matching entry "A.B.128.0/24", to the received LOC request message. The control-system relay node 7b relays and transmits the LOC request message to which the exclusion route information is added to the "relay destination" in the matching entry in the first searching of the control-system route table.

In FIG. 21, in response to the LOC request message, the egress management server 6b transmits the LOC response message to the ingress edge node 4a, (S74). At this point, the egress management server 6b compares "24", which is the "mask length" in the exclusion route information contained in the received LOC request message, with "16", which is the "mask length" in the matching entry "A.B.0.0/16" in the ID-LOC management table 661. In this case, since "24", which is the "mask length" in the exclusion route information contained in the received LOC request message, is larger, the egress management server 6b sets the "mask length" in the route information in the LOC response message to "24". As a result, the egress management server 6b generates a LOC response message "A.B.10.0/24, LOC2" or "A.B.10.11/24, LOC2" containing the destination ID range obtained from the destination ID, contained in the LOC request message, and the "mask length" 24, obtained from the above-described processing, and then transmits the generated LOC response message to the ingress edge node 4a.

Upon receiving the LOC response message, the ingress edge node 4a updates the LOC cache table 403 on the basis of the LOC response message. As a result, an entry "A.B.10.0/24, LOC2" or "A.B.10.11/24, LOC2" is added to the LOC cache table 403. Since S75 and S76 in FIG. 21 are substantially the same as S55 and S56 in FIG. 19, a description thereof is not given hereinafter.

FIG. 22 illustrates a state in which, in case 2, a next communication occurs from the host 3*a* (ID1) to the host 3*b* (ID3=A.B.128.22). Since S81 in FIG. 22 is substantially the same as S61 in FIG. 20, a description thereof is not given hereinafter.

Upon receiving a packet from the host 3*a* in the access network 2*a*, the ingress edge node 4*a* searches the LOC cache table 403 by using the destination address (ID3) of the packet as a search key. In this case, as a result of the searching of the LOC cache table 403 by using the ID3 (=A.B.128.22) as a search key, the ingress edge node 4*a* does not find a matching entry (that is, no entry is retrieved). This is because the ID3 (=A.B.128.22) does not match the entry "A.B.10.0/24, LOC2" or "A.B.10.11/24, LOC2" in the LOC cache table 403.

Since no matching entry is found as a result of the searching of the LOC cache table 403, the ingress edge node 4*a* transmits a LOC request message for querying about a LOC corresponding to the ID3, used as the search key of the searching, to the ingress management server 6*a* (S82). Since S83 to S86 in FIG. 22 are substantially the same as S73 to S76 in FIG. 20, a description thereof is not given hereinafter. Finally, in FIG. 22, the packet for the ID3 arrives at the host 3*c* (ID3) as in the case in FIG. 20.

Thus, according to the second embodiment, in case 2 (a case in which a communication first occurs from the host 3*a* to the host 3*b* and then a communication occurs from the host 3*a* to the host 3*c*), both of a packet for the host 3*b* (ID2) and a packet for the host 3*c* (ID3) which are transmitted from the host 3*a* (ID1) are properly received, as described above with reference to FIGS. 21 and 22. That is, according to the second embodiment, the packet non-arrival does not occur even in case 2.

As described above, according to the second embodiment, an entry in the LOC cache table 403 can be stored for each access network without occurrence of the packet non-arrival. In the second embodiment, when an exclusion route is found in the relay processing of the LOC request message (that is, when a matching entry is found in re-searching of the control-system route table), the mask length of the exclusion route is reflected in the entries in the LOC cache table 403. With this arrangement, with respect to only a destination ID that has no possibility of matching a previously found exclusion route, the ingress edge node 4*a* transmits an encapsulated packet without transmitting a LOC request message. In contrast, with respect to a destination ID that still has a possibility of matching a previously found exclusion route, the ingress edge node 4*a* transmits a LOC request message.

With this arrangement, with respect to an entry that is retrieved in the searching of the LOC cache table 403 in the related art but is not supposed to be retrieved, the ingress edge node 4*a* in the second embodiment transmits a LOC request message without performing the encapsulated-packet transmission based on the entry. As a result, the ingress edge node 4*a* transmits an encapsulated packet (a LISP packet) to a correct transfer destination (LOC) in the core network 1 on the basis of the LOC response message. The packet is eventually transmitted to the correct destination (ID).

Thus, according to the second embodiment, an entry in the LOC cache table 403 can be stored for each access network without occurrence of the packet non-arrival. Thus, it is possible to significantly reduce the size of the LOC cache table 403 while maintaining the functions of the LISP network. That is, the second embodiment offers an advantage in that the number of entries in the LOC cache table can be reduced in a practical communication system employing the LISP.

The second embodiment further has some advantages over the first embodiment. Although the ingress edge node 4*a* in the first embodiment has features added to the ingress edge node 4*a* in the LISP system in the related art, the ingress edge node 4*a* in the second embodiment may be replaced with the ingress edge node 4*a* in the LISP system in the related art without addition of features thereto. Accordingly, there is a possibility that the implementation cost in the first embodiment can be reduced compared to the second embodiment. In addition, the amounts of the exclusion route information in the LOC request message and the LOC response message in the second embodiment are smaller than the amounts of those in the first embodiment. Thus, there is a possibility that the communication load in the second embodiment can be reduced compared to the first embodiment. In addition, the ingress edge node 4*a* in the second embodiment may or may not have the exclusion LOC cache table 404. Thus, there is a possibility that a storage capacity used by the ingress edge node 4*a* in the second embodiment can be reduced compared to the first embodiment.

On the other hand, the first embodiment has an advantage in that the probability (the number) of queries for the LOC request message is small compared to the second embodiment. For example, in the example in FIG. 20 according to the first embodiment, a query occurs for, of IDs in the range of "A.B.0.0/16", only "A.B.128.0/24" that exists in the entries in the exclusion LOC cache table 404. In contrast, in the example in FIG. 22 according to the second embodiment, queries occur for, of IDs in the range of A.B.10.0/16 or A.B.10.11/16, all IDs that are not included in A.B.10.0/24 or A.B.10.11/24 in the entries in the LOC cache table 403. In this example, when the probabilities of queries for the LOC request message are compared based on a simple calculation, it is presumed that the probability in the first embodiment is ¹⁄₂₅₅th of the probability in the second embodiment. The difference between those probabilities decreases as the number of entries in the exclusion LOC cache table 404 in the first embodiment increases. In general, however, it is presumed that the probably (the number) of queries for the LOC request message in the first embodiment is small compared to the second embodiment.

[d] Other Embodiments

Although the configuration in each of the first embodiment and the second embodiment has the management server 6, a configuration that lacks the management server 6 may also be employed. In such a case, the edge node 4*a* has the management server's functions for relaying the LOC request message in the first embodiment and the second embodiment.

Figure 23:
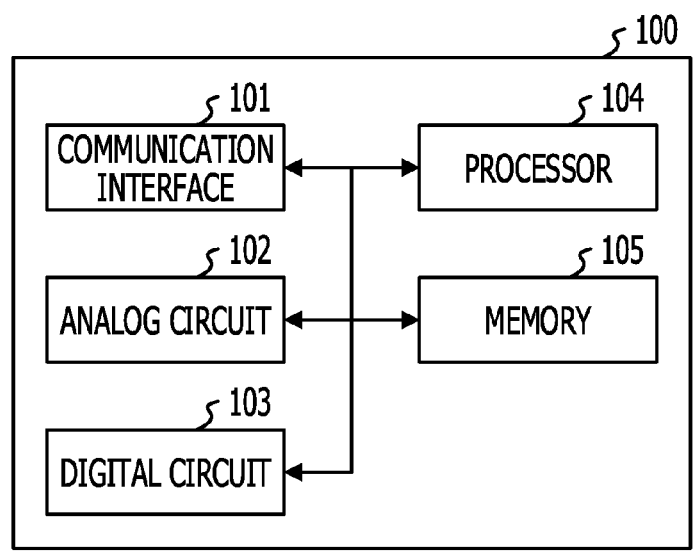
FIG. 23 illustrates one example of the hardware configuration of individual apparatuses in the communication system in each embodiment.

Lastly, one example of the hardware configuration of the individual apparatuses in each embodiment described above will be described with reference to FIG. 23. The functions of the apparatuses in each embodiment, namely, the functions of the ingress edge node 4*a*, the relay node 5, the egress edge node 4*b*, the ingress management server 6*a*, the control-system relay node 7, and the egress management server 6*b*, may be partly or entirely implemented by hardware components described below. As illustrated in FIG. 23, each apparatus (represented as an apparatus 100 in FIG. 23, for the sake of simplicity) in each embodiment described above includes a communication interface 101, an analog circuit 102, a digital circuit 103, a processor 104, and a memory 105.

The communication interface 101 is an interface device for communicating with another apparatus over the network and is, for example, an Ethernet (registered trademark) port or a wireless antenna. The analog circuit 102 processes an analog signal. The digital circuit 103 processes a digital signal and includes, for example, a large scale integration (LSI) circuit, a field-programming gate array (FPGA), and an application specific integrated circuit (ASIC). The processor 104 is a device for processing data and includes, for example, a central processing unit (CPU) and a digital signal processor (DSP). The memory 105 is a device for storing data and includes, for example, a read only memory (ROM) and a random access memory (RAM).

A description will now be given of the relationships between the functional configurations and the hardware configuration of the individual apparatuses.

The packet receiving unit 401 in the ingress edge node 4a is implemented by, for example, the communication interface 101, the analog circuit 102, the processor 104, the memory 105, and the digital circuit 103. Thus, the communication interface 101 receives a cable signal or radio signal containing an IP packet and the analog circuit 102 converts the cable signal or radio signal into a digital baseband signal. The processor 104 controls the memory 105, as appropriate, and cooperates with the digital circuit 103, as appropriate, to convert a digital baseband signal into an IP packet. The LOC identifying unit 402 is implemented by, for example, the processor 104, the memory 105, and the digital circuit 103. Thus, the processor 104 controls the memory 105, as appropriate, and cooperates with the digital circuit 103, as appropriate, to identify the egress edge node 4b that is the transfer destination of a received packet. The digital circuit 103 may also identify the egress edge node 4b that is the transfer destination of a received packet. The LOC cache table 403 and the exclusion LOC cache table 404 are implemented by, for example, the memory 105.

The encapsulating unit 405 in the ingress edge node 4a is implemented by, for example, the processor 104, the memory 105, and the digital circuit 103. Thus, the processor 104 controls the memory 105, as appropriate, and cooperates with the digital circuit 103, as appropriate, to encapsulate an IP packet. The digital circuit 103 may also encapsulate an IP packet. The relay-destination determination unit 406 is implemented by, for example, the processor 104, the memory 105, and the digital circuit 103. That is, the processor 104 controls the memory 105, as appropriate, and cooperates with the digital circuit 103, as appropriate, to determine the relay destination of an encapsulated packet. The digital circuit 103 may also determine the relay destination of an encapsulated packet. The route table 407 is implemented by, for example, the memory 105. The route-information exchanging and processing unit 408 is implemented by, for example, the processor 104, the memory 105, and the digital circuit 103. The packet transmitting unit 409 in the ingress edge node 4a is implemented by, for example, the communication interface 101, the analog circuit 102, the processor 104, the memory 105, and the digital circuit 103. Thus, the processor 104 controls the memory 105, as appropriate, and cooperates with the digital circuit 103, as appropriate, to convert an encapsulated packet (a LISP packet) to be transmitted into a digital baseband signal. The analog circuit 102 also converts a digital baseband signal into a cable signal or radio signal and the communication interface 101 transmits a cable signal or radio signal containing an encapsulated packet (a LISP packet).

The LOC-request generating unit 410 in the ingress edge node 4a is implemented by, for example, the processor 104, the memory 105, and the digital circuit 103. That is, the processor 104 controls the memory 105, as appropriate, and cooperates with the digital circuit 103, as appropriate, to generate a LOC request message. The digital circuit 103 may also generate the LOC request message. The LOC-request transmitting unit 411 in the ingress edge node 4a is implemented by, for example, the communication interface 101, the analog circuit 102, the processor 104, the memory 105, and the digital circuit 103. Thus, the processor 104 controls the memory 105, as appropriate, and cooperates with the digital circuit 103, as appropriate, to convert a LOC request message to be transmitted into a digital baseband signal. The analog circuit 102 also converts a digital baseband signal into a cable signal or radio signal and the communication interface 101 transmits a cable signal or radio signal containing a LOC request message. The LOC-response receiving unit 412 is implemented by, for example, the communication interface 101, the analog circuit 102, the processor 104, the memory 105, and the digital circuit 103. The communication interface 101 receives a radio signal or cable signal containing a LOC response message and the analog circuit 102 converts a cable signal or radio signal into a digital baseband signal. The processor 104 controls the memory 105, as appropriate, and cooperates with the digital circuit 103, as appropriate, to convert a digital baseband signal into a LOC response message. The LOC-response processing unit 413 is implemented by, for example, the processor 104, the memory 105, and the digital circuit 103. Thus, the processor 104 controls the memory 105, as appropriate, and cooperates with the digital circuit 103, as appropriate, to update the LOC cache table 403 and the exclusion LOC cache table 404. The digital circuit 103 may also update the LOC cache table 403 and the exclusion LOC cache table 404.

The packet receiving unit 501 in the relay node 5 is implemented by, for example, the communication interface 101, the analog circuit 102, the processor 104, the memory 105, and the digital circuit 103. The relay-destination determination unit 502 is implemented by, for example, the processor 104, the memory 105, and the digital circuit 103. The route table 503 is implemented by, for example, the memory 105. The route-information exchanging and processing unit 504 is implemented by, for example, the processor 104, the memory 105, and the digital circuit 103. The packet transmitting unit 505 is implemented by, for example, the communication interface 101, the analog circuit 102, the processor 104, the memory 105, and the digital circuit 103.

The packet receiving unit 451 in the egress edge node 4b is implemented by, for example, the communication interface 101, the analog circuit 102, the processor 104, the memory 105, and the digital circuit 103. Thus, the communication interface 101 receives a radio signal or cable signal containing an encapsulated packet and the analog circuit 102 converts a cable signal or radio signal into a digital baseband signal. The processor 104 also controls the memory 105, as appropriate, and cooperates with the digital circuit 103, as appropriate, to convert a digital baseband signal into an encapsulated packet.

The decapsulating unit 452 is implemented by, for example, the processor 104, the memory 105, and the digital circuit 103. Thus, the processor 104 controls the memory 105, as appropriate, and cooperates with the digital circuit 103, as appropriate, to decapsulate an encapsulated packet. The digital circuit 103 may also decapsulate an encapsulated packet.

The relay-destination determination unit 453 in the egress edge node 4b is implemented by, for example, the processor 104, the memory 105, and the digital circuit 103. Thus, the processor 104 controls the memory 105, as appropriate, and cooperates with the digital circuit 103, as appropriate, to identify the relay destination of an IP packet in the access network 2. The digital circuit 103 may also identify the relay destination of an IP packet in the access network 2. The route table 454 is implemented by, for example, the memory 105. The route-information exchanging and processing unit 455 is implemented by, for example, the processor 104, the memory 105, and the digital circuit 103. The packet transmitting unit 456 is implemented by, for example, the communication interface 101, the analog circuit 102, the processor 104, the memory 105, and the digital circuit 103. Thus, the processor 104 controls the memory 105, as appropriate, and cooperates with the digital circuit 103, as appropriate, to convert an IP packet to be transmitted into a digital baseband signal. The analog circuit 102 also converts a digital baseband signal into a cable signal or radio signal and the communication interface 101 transmits a cable signal or radio signal containing an IP packet.

The ID-LOC generating unit 457 in the egress edge node 4b is implemented by, for example, the processor 104, the memory 105, and the digital circuit 103. Thus, the processor 104 controls the memory 105, as appropriate, and cooperates with the digital circuit 103, as appropriate, to generate an ID-LOC registration message. The digital circuit 103 may also generate an ID-LOC registration message. The ID-LOC transmitting unit 458 is implemented by, for example, the communication interface 101, the analog circuit 102, the processor 104, the memory 105, and the digital circuit 103. Thus, the processor 104 controls the memory 105, as appropriate, and cooperates with the digital circuit 103, as appropriate, to convert an ID-LOC registration message to be transmitted into a digital baseband signal. The analog circuit 102 also converts a digital baseband signal into a cable signal or radio signal and the communication interface 101 transmits a cable signal or radio signal containing an ID-LOC registration message.

The LOC-request receiving unit 601 in the ingress management server 6a is implemented by, for example, the communication interface 101, the analog circuit 102, the processor 104, the memory 105, and the digital circuit 103. Thus, the communication interface 101 receives a cable signal or radio signal containing a LOC request message and the analog circuit 102 converts a cable signal or radio signal into a digital baseband signal. The processor 104 also controls the memory 105, as appropriate, and cooperates with the digital circuit 103, as appropriate, to convert a digital baseband signal into a LOC request message. The LOC-request relay unit 602 is implemented by, for example, the processor 104, the memory 105, and the digital circuit 103. Thus, the processor 104 controls the memory 105, as appropriate, and cooperates with the digital circuit 103, as appropriate, to determine the relay destination of a LOC request message. The digital circuit 103 may also determine the relay destination of a LOC request message.

The control-system route table 603 in the ingress management server 6a is implemented by, for example, the memory 105. The control-system route-information exchanging and processing unit 604 is implemented by, for example, the communication interface 101, the analog circuit 102, the processor 104, the memory 105, and the digital circuit 103. The LOC-request transmitting unit 605 is implemented by, for example, the communication interface 101, the analog circuit 102, the processor 104, the memory 105, and the digital circuit 103. Thus, the processor 104 controls the memory 105, as appropriate, and cooperates with the digital circuit 103, as appropriate, to convert a LOC request message to be transmitted into a digital baseband signal. The analog circuit 102 also converts a digital baseband signal into a cable signal or radio signal and the communication interface 101 transmits a cable signal or radio signal containing a LOC request message.

The LOC-request receiving unit 701 in the control-system relay node 7 is implemented by, for example, the communication interface 101, the analog circuit 102, the processor 104, the memory 105, and the digital circuit 103. Thus, the communication interface 101 receives a cable signal or radio signal containing a LOC request message and the analog circuit 102 converts a cable signal or radio signal into a digital baseband signal. The processor 104 also controls the memory 105, as appropriate, and cooperates with the digital circuit 103, as appropriate, to convert a digital baseband signal into a LOC request message. The LOC-request relay unit 702 is implemented by, for example, the processor 104, the memory 105, and the digital circuit 103. Thus, the processor 104 controls the memory 105, as appropriate, and cooperates with the digital circuit 103, as appropriate, to determine the relay destination of a LOC request message. The digital circuit 103 may also determine the relay destination of the LOC request message.

The control-system route table 703 in the control-system relay node 7 is implemented by, for example, the memory 105. The control-system route-information exchanging and processing unit 704 is implemented by, for example, the communication interface 101, the analog circuit 102, the processor 104, the memory 105, and the digital circuit 103. The LOC-request transmitting unit 705 is implemented by, for example, the communication interface 101, the analog circuit 102, the processor 104, the memory 105, and the digital circuit 103. Thus, the processor 104 controls the memory 105, as appropriate, and cooperates with the digital circuit 103, as appropriate, to convert a LOC request message to be transmitted into a digital baseband signal. The analog circuit 102 also converts a digital baseband signal into a cable signal or radio signal and the communication interface 101 transmits a cable signal or radio signal containing a LOC request message.

The LOC-request receiving unit 651 in the egress management server 6b is implemented by, for example, the communication interface 101, the analog circuit 102, the processor 104, the memory 105, and the digital circuit 103. Thus, the communication interface 101 receives a cable signal or radio signal containing a LOC request message and the analog circuit 102 converts a cable signal or radio signal into a digital baseband signal. The processor 104 may also control the memory 105, as appropriate, and cooperates with the digital circuit 103, as appropriate, to convert a digital baseband signal into a LOC request message. The ID-LOC searching unit 652 is implemented by, for example, the processor 104, the memory 105, and the digital circuit 103. Thus, the processor 104 controls the memory 105, as appropriate, and cooperates with the digital circuit 103, as appropriate, to search the ID-LOC management table 661. The digital circuit 103 may also search the ID-LOC management table 661. The LOC-request relay unit 653 in the egress management server 6b is implemented by, for example, the processor 104, the memory 105, and the digital circuit 103. Thus, the processor 104 controls the memory 105, as appropriate, and cooperates with the digital circuit 103, as appropriate, to determine the relay destination of the LOC request message. The digital circuit 103 may also determine the relay destination of the LOC request message.

The control-system route table 654 in the egress management server 6b is implemented by, for example, the memory 105. The control-system route-information exchanging and processing unit 655 is implemented by, for example, the communication interface 101, the analog circuit 102, the processor 104, the memory 105, and the digital circuit 103. The LOC-request transmitting unit 656 is implemented by, for example, the communication interface 101, the analog circuit 102, the processor 104, the memory 105, and the digital circuit 103. Thus, the processor 104 controls the memory 105, as appropriate, and cooperates with the digital circuit 103, as appropriate, to convert a LOC request message to be transmitted into a digital baseband signal. The analog circuit 102 also converts a digital baseband signal into a cable signal or radio signal and the communication interface 101 transmits a cable signal or radio signal containing a LOC request message.

The LOC-response generating unit 657 in the egress management server 6b is implemented by, for example, the communication interface 101, the analog circuit 102, the processor 104, the memory 105, and the digital circuit 103. Thus, the processor 104 controls the memory 105, as appropriate, and cooperates with the digital circuit 103, as appropriate, to generate a LOC response message. The digital circuit 103 may also generate a LOC response message. The LOC response transmitting unit 658 is implemented by, for example, the communication interface 101, the analog circuit 102, the processor 104, the memory 105, and the digital circuit 103. Thus, the processor 104 controls the memory 105, as appropriate, and cooperates with the digital circuit 103, as appropriate, to convert a LOC response message to be transmitted into a digital baseband signal. The analog circuit 102 also converts a digital baseband signal into a cable signal or radio signal and the communication interface 101 transmits a cable signal or radio signal containing a LOC response message.

The ID-LOC receiving unit 659 in the egress management server 6b is implemented by, for example, the communication interface 101, the analog circuit 102, the processor 104, the memory 105, and the digital circuit 103. The ID-LOC registering unit 660 is implemented by, for example, the processor 104, the memory 105, and the digital circuit 103. The ID-LOC management table 661 is implemented by, for example, the memory 105.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication apparatus comprising:
   a first network interface coupled to a core network that couples to a plurality of access networks via a plurality of edge apparatuses including the communication apparatus, each access network having each of a plurality of address ranges assigned and being coupled to the core network via each edge apparatus, wherein each of the plurality of address ranges includes a network address and a mask length corresponding to each edge apparatus to which an edge address is assigned;
   a second network interface coupled to a specified access network of the plurality of access networks; and
   a processor configured to:
   receive a packet designating a destination address from the specified access network,
   transmit an edge address request message designating the destination address and requesting a specified edge address and a specified address range that includes the designated destination address, the specified edge address corresponding to the specified address range, and
   receive an edge address response message indicating an association of the specified edge address and the specified address range, the edge address response message being transmitted in response to the edge address request message, wherein
   the plurality of address ranges includes a first address range and a second address range, the second address range being included in the first address range, and
   when the designated destination address in the edge address request message is included in a difference between the first address range and the second address range, the processor is configured to receive the edge address response message that is modified based on the second address range.

2. The communication apparatus according to claim 1, wherein the edge address response message is modified so as to indicate a mask address of the second address range.

3. The communication apparatus according to claim 1, wherein the edge address response message is modified so as to indicate the second address range.

4. The communication apparatus according to claim 1, further comprising:
   a memory configured to store a cache table including at least one of the plurality of address ranges, each address range corresponding to each edge address in a routing table, wherein
   the processor is configured to search for the designated destination address in the received packet among at least one of the plurality of address ranges in the cache table, and
   the edge address request message is transmitted by the processor when not only the search fails but also when the processor detects that the designated destination address is included in the first address range but is further included in the second address range in the search.

5. A communication apparatus comprising:
   at least one network interface coupled to a plurality of adjacent apparatuses in a core network that couples to a plurality of access networks via a plurality of edge apparatuses, each access network having each of a plurality of address ranges assigned and being coupled to the core network via each edge apparatus, wherein each of the plurality of address ranges includes a network address and a mask length corresponding to each edge apparatus to which an edge address is assigned;
   a memory configured to store a routing table including the plurality of address ranges, each address range corresponding to one of the plurality of adjacent apparatuses in the routing table; and
   a processor configured to:
   relay, when receiving an edge address request message designating a destination address, the received edge address request message to one of the plurality of adjacent apparatuses that corresponds to a specified address range in the routing table, the specified address range being one of the plurality of address ranges that includes the designated destination address, wherein the plurality of address ranges includes a first address range and a second address range, the second address range being included in the first address range, and when the processor detects that the designated destination address is included in a difference between the first address range and the second address range, the processor is configured to relay the received edge address request message with information relating to the second address range.

6. The communication apparatus according to claim 5, wherein the information relating to the second address range includes a specified mask length corresponding to the second address range.

7. The communication apparatus according to claim 6, wherein the information relating to the second address range further includes a specified network address corresponding to the second address range.

8. A communication apparatus comprising:

a first network interface coupled to a core network that couples to a plurality of access networks via a plurality of edge apparatuses including the communication apparatus, each access network having each of a plurality of address ranges assigned and being coupled to the core network via each edge apparatus, wherein each of the plurality of address ranges includes a network address and a mask length corresponding to each edge apparatus to which an edge address is assigned, and the communication apparatus has a specified edge address assigned, a second network interface coupled to a specified access network of the plurality of access networks, the specified access network having a first address range assigned, the first address range including a specified network address and a specified mask length; and a processor configured to:

transmit, when receiving an edge address request message designating a destination address that is included in the first address range, an edge address response message indicating an association of the specified edge address and the first address range in response to the received edge address request message, wherein the plurality of address ranges includes a second address range, the second address range included in the first address range, and when the processor detects that the edge address request message is received with information relating to the second address range, the processor is configured to transmit the edge address response message that is modified based on the second address range.

9. The communication apparatus according to claim 8, wherein the information relating to the second address range includes a specified mask length corresponding to the second address range.

10. The communication apparatus according to claim 2, wherein the information relating to the second address range further includes a specified network address corresponding to the second address range.

* * * * *